(12) United States Patent
Tsai et al.

(10) Patent No.: US 11,054,952 B2
(45) Date of Patent: Jul. 6, 2021

(54) TOUCH PANEL AND MANUFACTURING METHOD THEREOF

(71) Applicant: Cambrios Film Solutions Corporation, Tortola (VG)

(72) Inventors: Yi-Chen Tsai, Chiayi (TW); Wei-Chia Fang, Zhubei (TW); Chun-Hung Chu, Hsinchu (TW); Meng-Yun Wu, Yilan County (TW); Chung-Chin Hsiao, Zhubei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/994,088

(22) Filed: Aug. 14, 2020

(65) Prior Publication Data
US 2021/0157447 A1    May 27, 2021

(30) Foreign Application Priority Data

Nov. 26, 2019    (CN) .......................... 201911176882.6

(51) Int. Cl.
     *G06F 3/044*      (2006.01)
(52) U.S. Cl.
     CPC .. *G06F 3/0443* (2019.05); *G06F 2203/04103* (2013.01)

(58) Field of Classification Search
     USPC .................................................. 345/170–178
     See application file for complete search history.

(56) References Cited

U.S. PATENT DOCUMENTS

| | | | |
|---|---|---|---|
| 2017/0033323 A1* | 2/2017 | Chida | H01L 51/5246 |
| 2019/0271911 A1* | 9/2019 | Wu | G03F 7/30 |
| 2019/0271912 A1* | 9/2019 | Li | H05K 3/027 |
| 2020/0012372 A1* | 1/2020 | Chang | G06F 3/0412 |
| 2020/0068122 A1* | 2/2020 | Jang | H04N 5/2628 |
| 2020/0097113 A1* | 3/2020 | Fang | G06F 3/04164 |
| 2020/0301557 A1* | 9/2020 | Hsiao | G06F 3/04164 |
| 2020/0319751 A1* | 10/2020 | Yu | G06F 3/0443 |

* cited by examiner

*Primary Examiner* — Tony O Davis
(74) *Attorney, Agent, or Firm* — Cooper Legal Group, LLC

(57) ABSTRACT

A touch panel and a manufacturing method thereof are provided. The touch panel includes a substrate, peripheral leads, a touch-sensing electrode, and first covers. The peripheral leads are disposed on the substrate. Each peripheral lead has a sidewall and an upper surface. The first covers cover the upper surfaces of the peripheral leads. The touch-sensing electrode includes a plurality of modified metal nanowires. The modified metal nanowires have first surfaces in direct contact with each other at an intersection. The modified metal nanowires have second surfaces with a covering structure, and the second surfaces are at non-intersections.

20 Claims, 20 Drawing Sheets

TOUCH PANEL AND MANUFACTURING METHOD THEREOF

CROSS-REFERENCE TO RELATED APPLICATION

This application claims priority to China Application Serial Number 201911176882.6, filed Nov. 26, 2019, which is herein incorporated by reference.

BACKGROUND

Field of Disclosure

The present disclosure relates to a touch panel and a manufacturing method thereof.

Description of Related Art

In recent years, transparent conductors are often used in many display or touch-related devices due to their light transmittance and suitable electrical conductivity. Generally speaking, transparent conductors may be various metal oxides, such as indium tin oxide (ITO), indium zinc oxide (IZO), cadmium tin oxide (CTO), or aluminum-doped zinc oxide (AZO). However, these metals oxides fail to meet the flexibility requirements of display devices. Therefore, a variety of flexible transparent conductors have been developed today, such as transparent conductors made of nanowires.

However, there are still many problems to be solved in the technology of manufacturing the nanowires. For example, when using nanowires to manufacture touch electrodes, an alignment error region must be reserved for the alignment of nanowires and leads on the peripheral region. Because of the alignment error region, the dimension of leads on the peripheral region is unable to be reduced, resulting in a large width of the peripheral region. In particular, when a roll-to-roll process is adopted, deformation of a substrate makes the size of the alignment error region larger (for example, 150 μm), so the minimum width of the peripheral area is only 2.5 mm, which cannot meet requirements for a narrow bezel of a display. Moreover, although silver nanowires have high electrical conductivity, the high reflection of silver materials may influence the optical properties of the display. Some studies have proposed coating the surface of silver nanowires with low-reflective materials to achieve higher optical transparency. However, the low-reflective materials coated on the surface of silver nanowires result in higher resistance where silver nanowires intersect to form a lap joint. In other words, although coating with low reflective material may improve optical properties, the electrical advantages may vanish.

SUMMARY

In some embodiments of the present disclosure, a covering structure is formed on specific surfaces of metal nanowires (surfaces not in contact with one another) to achieve an objective of increasing optical characteristics, while maintaining electrical characteristics of an electrode composed of the metal nanowires.

In some embodiments of the present disclosure, by designing a first cover including at least metal nanowires to cover the peripheral leads and a mark, there is no need to reserve an alignment error region during alignment, such that the peripheral leads are formed with a smaller width and thereby fulfilling the requirement of a narrow bezel. Moreover, in some embodiments of the present disclosure, a novel touch-sensing tape-on-reel structure is proposed, resulting in an unprecedented touch panel structure.

According to some embodiments of the present disclosure, a touch panel includes a substrate having a display region and a peripheral region; a plurality of peripheral leads disposed on the substrate; a plurality of first covers covering upper surfaces of the peripheral leads; and a touch-sensing electrode disposed on the display region of the substrate. The touch-sensing electrode is electrically connected to the peripheral leads, in which the touch-sensing electrode includes a plurality of modified metal nanowires. The modified metal nanowires have first surfaces in direct contact with each other at an intersection. The modified metal nanowires have second surfaces with a covering structure, and the second surfaces are at non-intersections.

In some embodiments of the present disclosure, the first covers include the modified metal nanowires.

In some embodiments of the present disclosure, the first covers include a plurality of unmodified metal nanowires.

In some embodiments of the present disclosure, the touch panel further includes a film layer, and the modified metal nanowires are exposed from the film layer.

In some embodiments of the present disclosure, the touch-sensing electrode further includes a plurality of unmodified metal nanowires disposed in the film layer.

In some embodiments of the present disclosure, the second cover has a side surface, and the side surface and a sidewall of a mark are surfaces that are concurrently etched.

In some embodiments of the present disclosure, the covering structure is a layered structure, an island-shaped protrusion structure, or a point-shaped protrusion structure which are made of a conductive material, or a combination thereof.

In some embodiments of the present disclosure, the conductive material is silver, gold, copper, platinum, iridium, rhodium, palladium, or osmium.

In some embodiments of the present disclosure, the conductive material is graphene, carbon nanotubes, conductive polymers, or conductive oxides.

According to some embodiments of the present disclosure, a method of manufacturing a touch panel is provided. The method includes providing a substrate having a display region and a peripheral region; disposing a metal layer on the peripheral region; disposing a plurality of unmodified metal nanowires on the display region and the peripheral region, in which the unmodified metal nanowires have first surfaces in direct contact with each other at an intersection and the unmodified metal nanowires each have a second surface at a non-intersection; performing a modification step to form a metal nanowire layer including a plurality of modified metal nanowires, in which the second surface of each of the modified metal nanowires has a covering structure; and performing a patterning step, wherein the metal nanowire layer on the display region is patterned to form a touch-sensing electrode including the modified metal nanowires.

In some embodiments of the present disclosure, performing the patterning step further includes: patterning the metal layer and the metal nanowire layer on the peripheral region at one time, in which the patterned metal layer forms a plurality of peripheral leads, the patterned metal nanowire layer forms a plurality of first covers, and the first covers are disposed on the peripheral leads.

In some embodiments of the present disclosure, the first covers include the modified metal nanowires.

In some embodiments of the present disclosure, disposing the unmodified metal nanowires on the display region and the peripheral region further includes disposing a film layer on the unmodified metal nanowires. An exposed portion of the unmodified metal nanowires is exposed from the film layer, and the exposed portion forms the modified metal nanowires by the modification step. A non-exposed portion of the unmodified metal nanowires is embedded in the film layer and is not affected by the modification step.

In some embodiments of the present disclosure, the modification step includes coating, chemical plating, electroplating, or sputtering to form the covering structure. The covering structure is a layered structure, an island-shaped protrusion structure, or a point-shaped protrusion structure which are made of a conductive material, or a combination thereof.

In some embodiments of the present disclosure, the covering structure is disposed on a sidewall of each of the peripheral leads and a sidewall of the mark.

According to some embodiments of the present disclosure, a method of manufacturing a touch panel includes: providing a substrate having a display region and a peripheral region; disposing a metal layer on the peripheral region; disposing a plurality of unmodified metal nanowires on the display region and the peripheral region, in which the unmodified metal nanowires have first surfaces in direct contact with each other at an intersection, and the modified metal nanowires have second surfaces with a covering structure, and the second surfaces are at non-intersections; performing a patterning step; and performing a modification step to form a metal nanowire layer including a plurality of modified metal nanowires, in which a covering structure is disposed on the second surface of each of the modified metal nanowires. The patterning step includes patterning the metal nanowire layer on the display region to form the touch-sensing electrode including the modified metal nanowires.

In some embodiments of the present disclosure, the mark includes an abutting alignment mark disposed on the peripheral region of each of the touch panels, a cutting alignment mark disposed between the adjacent touch panels, or an alignment mark, direction mark, dimension mark, or digital or word mark disposed on the substrate.

In some embodiments of the present disclosure, a width of the peripheral lead ranges from 5 μm-20 μm, and a distance between the adjacent peripheral leads ranges from 5 μm-20 μm.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

As used herein, "around", "about" or "approximately" shall generally mean within 20 percent, preferably within 10 percent, and more preferably within 5 percent of a given value or range. Numerical quantities given herein are approximate, meaning that the term "around", "about", or "approximately" may be inferred if not expressly stated.

Figure 1:
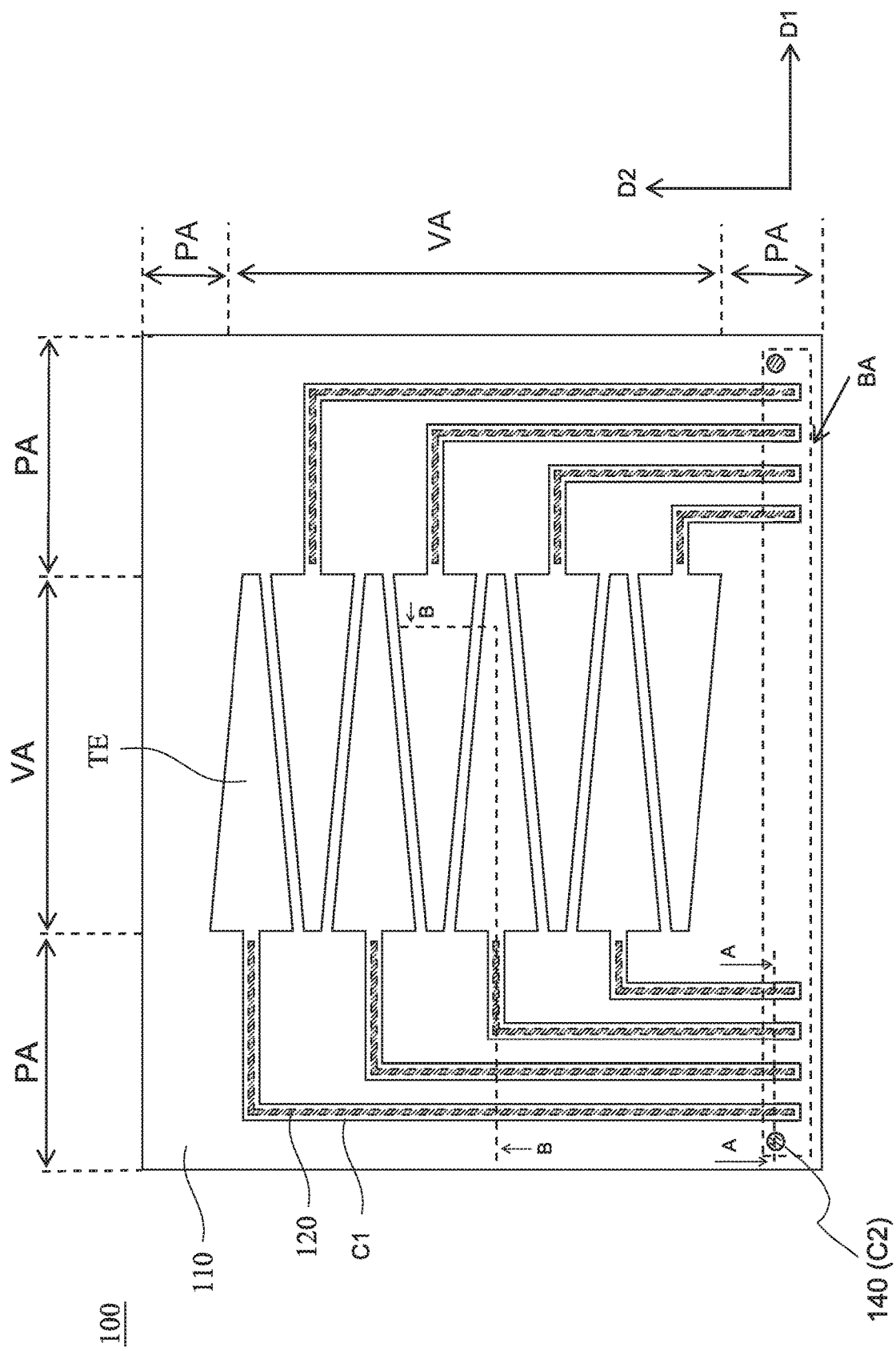
FIG. 1 is a schematic top view of a touch panel according to some embodiments of the present disclosure.
Figure 1A:
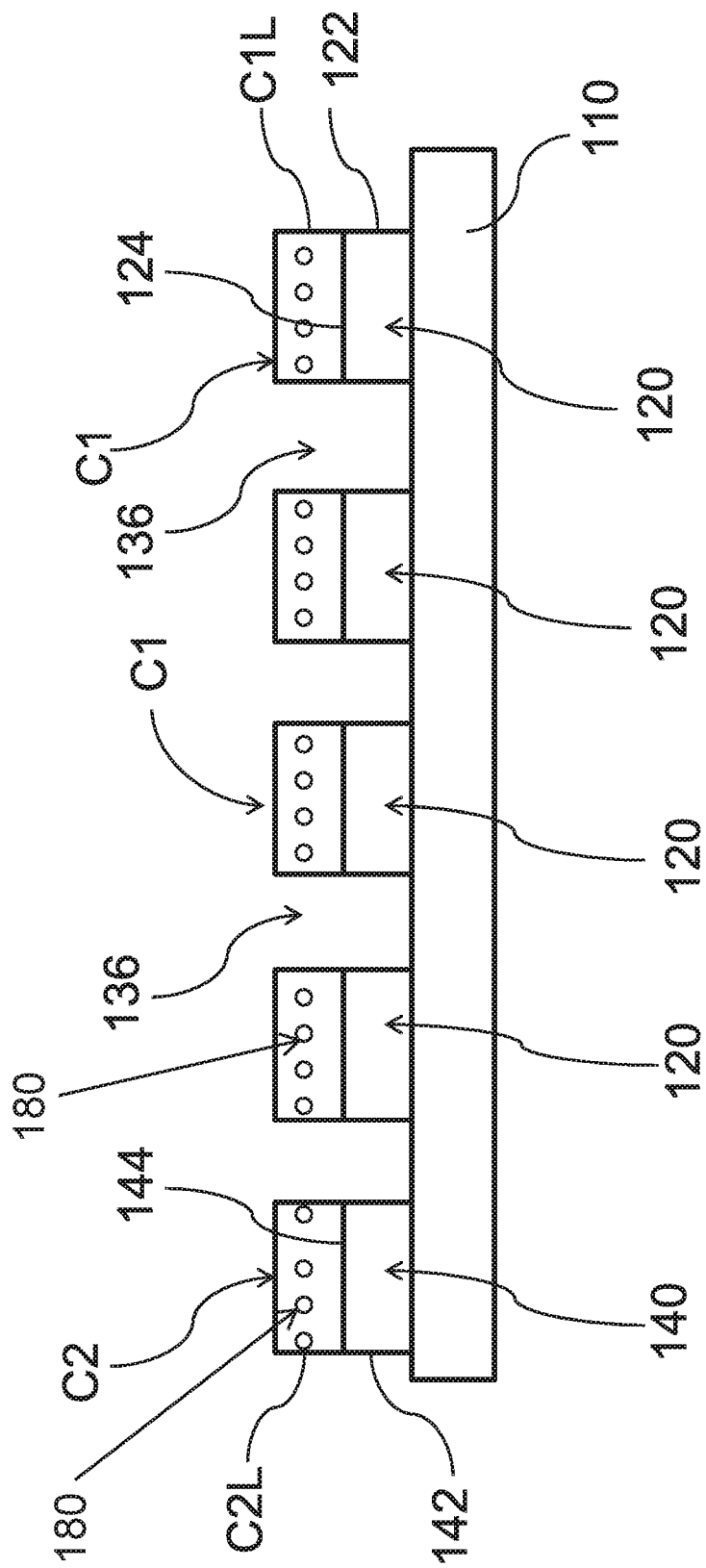
FIG. 1A is a cross-sectional schematic view along line A-A in FIG. 1.
Figure 1B:
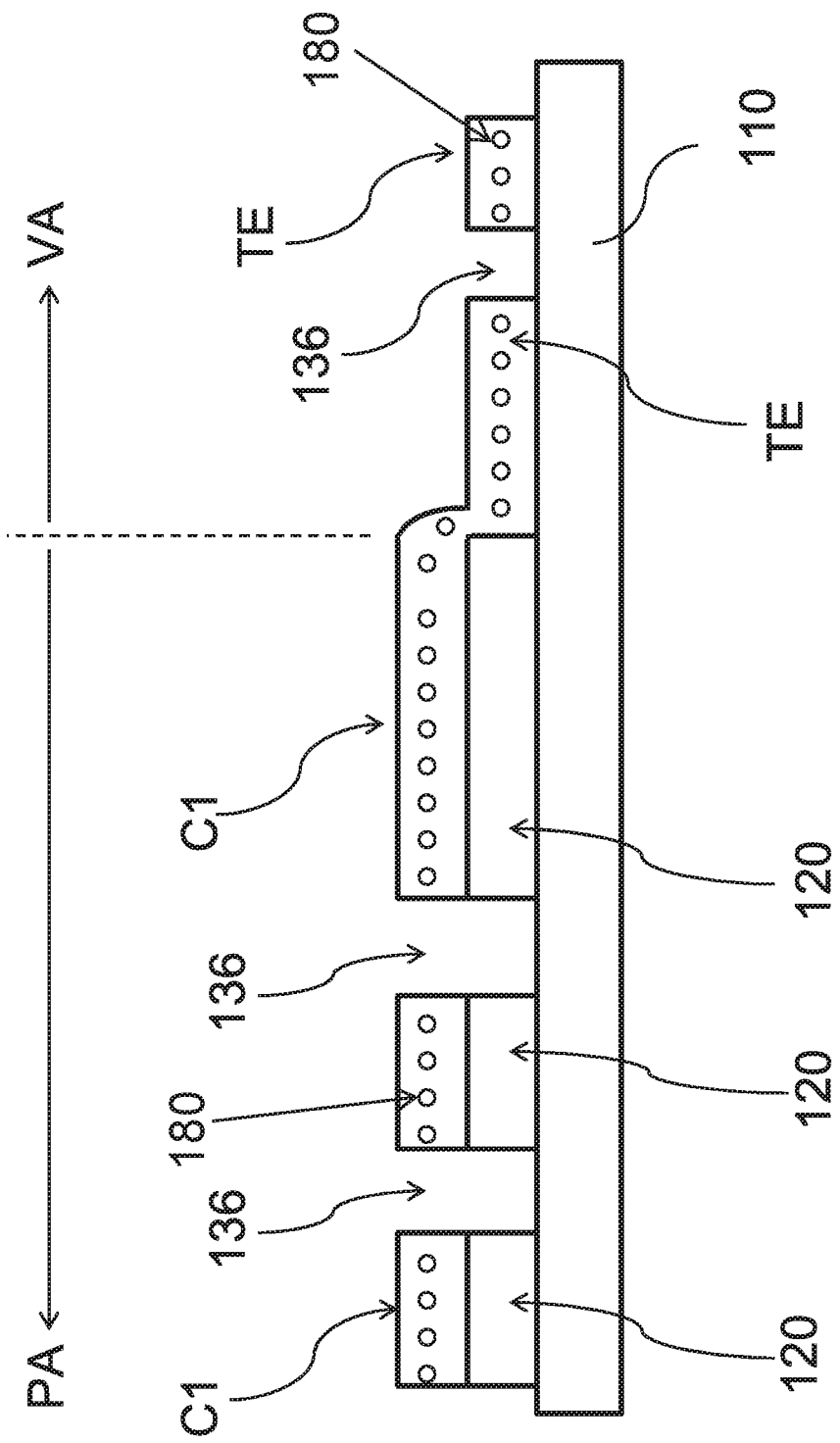
FIG. 1B is a cross-sectional schematic view along line B-B in FIG. 1.

FIG. 1 is a schematic top view of a touch panel 100 according to some embodiments of the present disclosure. FIG. 1A and FIG. 1B are respectively cross-sectional schematic views along line A-A and line B-B of FIG. 1. The touch panel 100 includes a substrate 110, peripheral leads 120, first covers C1, and a touch-sensing electrode TE. The number of peripheral leads 120, first covers C1, and touch-sensing electrodes TE may be one or more, and the number shown in each of the following specific examples and drawings are for illustrative purposes only and does not limit the present disclosure. The touch-sensing electrodes TE include a plurality of the modified metal nanowires 190. The modified metal nanowires 190 each have a first surface 191 in direct contact with a first surface of another modified metal nanowire at an intersection. A covering structure 180 is disposed on a second surface 192 of the modified metal nanowires 190 at a non-intersection (see FIG. 2B). FIG. 1 is a schematic top view of the touch panel 100 according to some embodiments of the present disclosure. Reference is made to FIG. 1 to FIG. 1B. The touch panel 100 may include the substrate 110, the peripheral lead 120, a mark 140, the first covers C1, a second cover C2, and the touch-sensing electrode TE. The peripheral lead 120 is disposed between the first covers C1 and the substrate 110. The mark 140 is disposed between the second cover C2 and the substrate 110. The touch-sensing electrode TE is substantially located at a display region VA and is formed by patterning a metal nanowire layer NWL including the modified metal nanowires 190. The modified metal nanowires 190 each have a first surface 191 in direct contact with a first surface of another modified metal nanowire at an intersection. The covering structure 180 is disposed on the second surface 192 of the modified metal nanowires 190 at a non-intersection. By means of forming the covering structure 180 on surfaces of the metal nanowires 190 (the second surface 192 at the non-intersection), the reflectivity of light of the metal nanowires 190 can be reduced or avoided, thereby improving the haze of the touch panel 100. In addition, the intersections of the metal nanowires 190 are in direct contact. In other words, the covering structure 180 is not formed on the contacting surfaces of the metal nanowires 190, and therefore the low-resistance characteristic of the conductive network of the metal nanowires 190 is maintained. To simplify the drawings, the covering structure 180 is depicted in the touch-sensing electrode TE, the first covers C1, and the second cover C2 in FIG. 1A and FIG. 1B to indicate that all of the touch-sensing electrode TE, the first covers C1, and the second cover C2 include the modified metal nanowires 190. FIG. 1A and FIG. 1B are further described below.

Furthermore, the first covers C1 and the second cover C2 may be formed of the metal nanowire layer NWL including the unmodified or modified metal nanowires 190 based on different processes, such as an unmodified or modified silver nanowire layer, an unmodified or modified gold nanowire layer, or an unmodified or modified copper nanowire layer.

Reference is made to FIG. 1. The substrate 110 has the display region VA and the peripheral region PA. The peripheral region PA is disposed on the side of the display region VA. For example, the peripheral region PA may be a frame-shaped region disposed around the display region VA (namely encompassing right side, left side, upper side, and lower side). However, in other examples, the peripheral region PA is an L-shaped region disposed on the left side and lower side of the display region VA. As shown in FIG. 1, in the present example, a total of eight sets of the peripheral leads 120 and the first covers C1 corresponding to the peripheral leads 120 are disposed on the peripheral region PA of the substrate 110. The touch-sensing electrode TE is disposed on the display region VA of the substrate 110. In the present example, two sets of the mark 140 and the second cover C2 corresponding to the mark 140 are disposed on the peripheral region PA of the substrate 110. Therefore, the first covers C1 and the second cover C2 are respectively disposed on upper surfaces 124 of the peripheral leads 120 and the upper surface 144 of the mark 140, such that upper and lower material layers can be formed in the predetermined positions without alignment. Accordingly, the need for an alignment error region in the manufacturing process is reduced or avoided, thereby reducing the width of the peripheral region PA and further fulfilling the requirement of a narrow bezel of the display device.

Figure 2A:
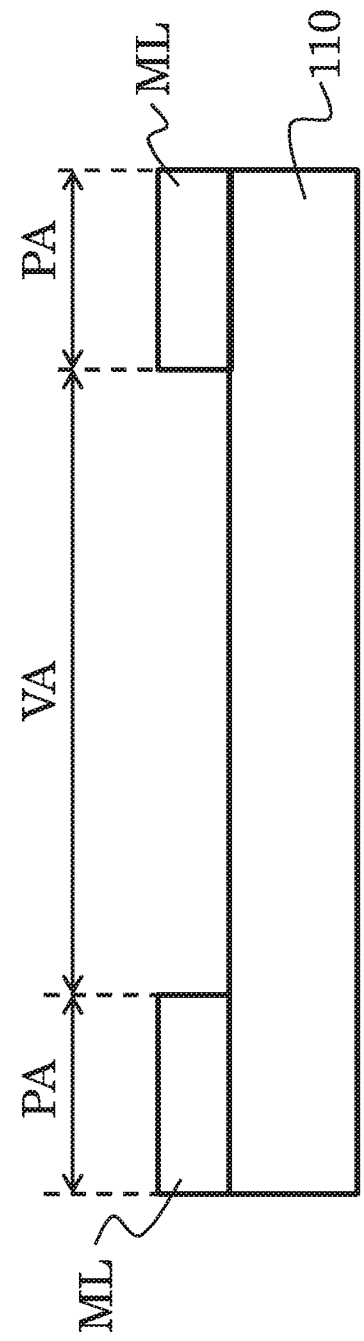
FIG. 2A to FIG. 2D are schematic views of a manufacturing method of the touch panel according to some embodiments of the present disclosure.
Figure 2B:
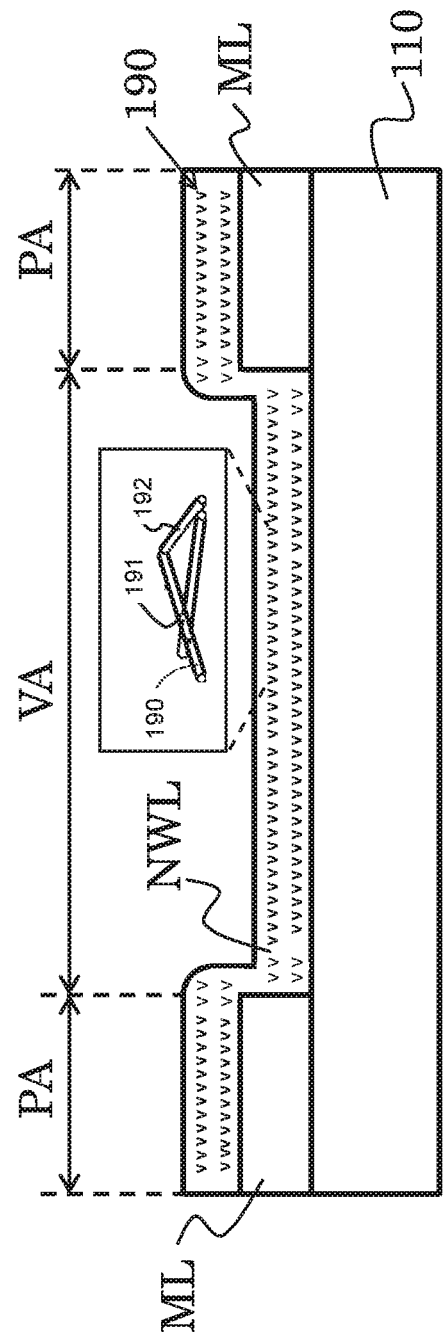
Figure 2C:
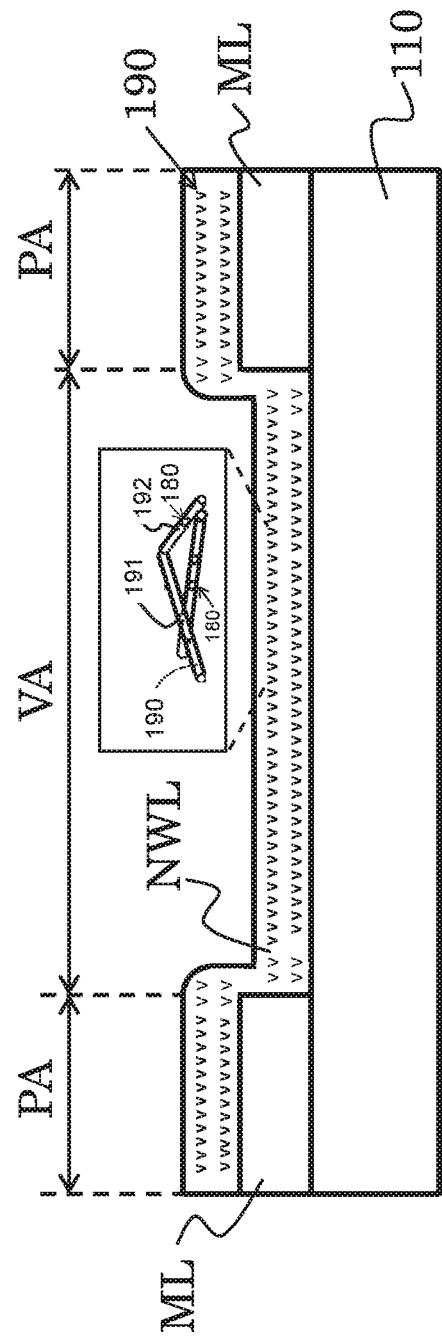
Figure 2D:
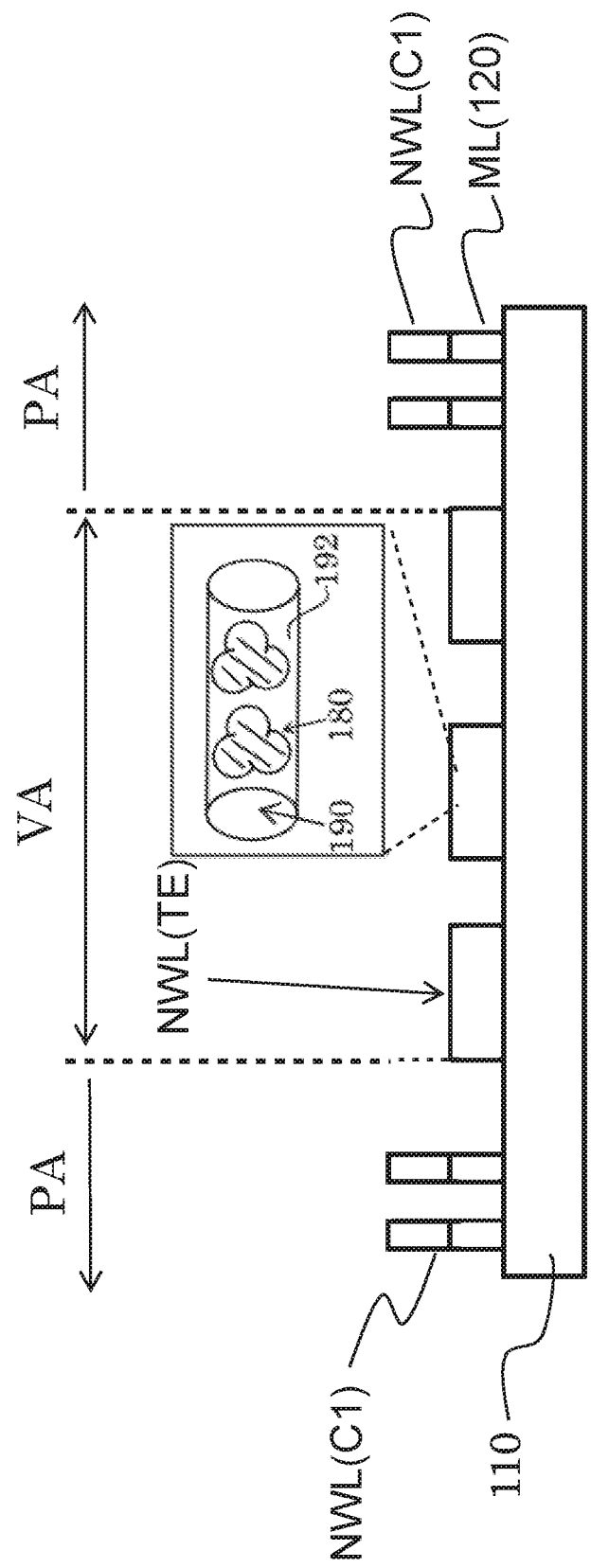

Reference is made to FIG. 2A to FIG. 2D, which show a method of manufacturing the touch panel 100. First, the substrate 110 having a pre-defined peripheral region PA and display region VA is provided. Next, a metal layer ML is formed on the peripheral region PA (as shown in FIG. 2A). Subsequently, a plurality of unmodified metal nanowires 190 are disposed on the substrate 110 to form the metal nanowire layer NWL on the peripheral region PA and the display region VA (as shown in FIG. 2B). The modified metal nanowires 190 each have a first surface 191 in direct contact with a first surface of another modified metal nanowire at an intersection and a second surface 192 at a non-intersection. After that, a modification step is performed. The covering structure 180 is formed on the second surface 192 of the modified metal nanowires 190 at a non-intersection (as shown in FIG. 2C). Next, a patterning step is performed to form the metal layer ML and the metal nanowire layer NWL having patterns (as shown in FIG. 2D), in which the metal nanowire layer NWL located on the display region VA is patterned to form the touch-sensing electrode TE (see FIG. 1 and FIG. 1B). The metal layer ML on the peripheral region PA may be patterned subsequently to form the peripheral leads 120 or the mark 140. Also, due to the modification step, the touch-sensing electrode TE includes the modified metal nanowires 190.

The foregoing steps are described in more detail below.

Reference is made to FIG. 2A. In this step, the metal layer ML is formed on the peripheral region PA of the substrate 110. The metal layer ML may be patterned subsequently to form the peripheral leads 120 or the mark 140. In detail, in some embodiments of the present disclosure, the metal layer ML may be made of metal with higher electrical conductivity, preferably a single-layer metal structure, such as a silver layer, a copper layer, etc.; or a multilayer conductive structure, such as molybdenum/aluminum/molybdenum, copper/nickel, titanium/aluminum/titanium, molybdenum/chromium, etc. The above-mentioned metal structure is preferably opaque, for example, the transmission of visible light (such as with a wavelength between 400 nm-700 nm) is less than about 90%.

In the present example, the metal may be formed on the metal nanowire layer NWL by sputtering (such as, but not limited to, physical sputtering, chemical sputtering, etc.). The metal layer ML may be directly and selectively formed on the peripheral region PA and not on the display region VA. Alternatively, the metal layer ML is blanketly formed on the peripheral region PA and the display region VA, and the metal layer ML on the display region VA is subsequently removed by etching or other steps.

In one example, a copper layer is deposited on the peripheral region PA of the substrate 110 by a chemical plating process. In the chemical plating process, by means of using a suitable reducing agent without external current, metal ions in a plating solution are reduced to metal under the catalysis of a metal catalyst and are coated on a surface. The process is also referred to as electroless plating, chemical plating, or autocatalytic plating. Therefore, the metal layer ML in the present example can also be referred to as an electroless plating layer, a chemical plating layer, or an autocatalytic plating layer. Specifically, a plating liquid having copper sulfate as the main component may be used, where the composition thereof may include but is not limited to copper sulfate with a concentration of 5 g/L, ethylenediaminetetraacetic acid with a concentration of 12 g/L, and formaldehyde with a concentration of 5 g/L. The pH of the electroless plating copper plating liquid is adjusted to about 11 to 13 by using sodium hydroxide. The temperature of the plating bath is about 50 to 70° C. The reacting time of immersion is 1 to 5 minutes. In one example, a catalytic layer (not shown) may be first formed on the peripheral region PA of the substrate 110. Since there is no catalytic layer on the display region VA, the copper layer is only deposited on the peripheral region PA and is not formed on the display region VA. During the reaction of electroless plating, the copper material may nucleate on the catalytic layer having catalytic/activation ability, and a copper film then continues to grow by the self-catalysis of copper. In one example, a copper layer is deposited on the peripheral region PA of the substrate 110 by sputtering.

Reference is made to FIG. 2B. The metal nanowire layer NWL including at least the metal nanowires 190, such as a silver nanowire layer, a gold nanowire layer, or a copper nanowire layer, is coated on the peripheral region PA and the display region VA of the substrate 110. A first portion of the metal nanowire layer NWL is mainly located on the display region VA, and a second portion is mainly located on the peripheral region PA and is disposed on the metal layer ML. The specific method in the present example includes a coating process as follows. A dispersion or ink including the metal nanowires 190 is formed on the substrate 110 and is then dried, such that the surface of the substrate 110 and/or the metal layer ML is covered by the metal nanowires 190, thereby forming the metal nanowire layer NWL. After the curing/drying step, the solvent or the like is evaporated, and the metal nanowires 190 are distributed on the surface of the substrate 110 randomly. Preferably, the metal nanowires 190 are fixed on the surface of the substrate 110 and/or the metal layer ML without peeling to form the metal nanowire layer NWL, and the metal nanowires 190 may be in contact with each other to provide a continuous electrical current pathway, thereby forming a conductive network. A schematic enlarged view in FIG. 2B shows the contact aspects of the metal nanowires 190. The first surfaces 191 of the metal nanowires 190 are in contact with each other at an intersection to form an electron transmission pathway, while the second surfaces 192 are exposed surfaces not contacting each other. Take silver nanowires as an example. One silver nanowire and another silver nanowire are in direct contact at intersection (the first surface 191 is a silver-silver contact interface). Thus, a low resistance electron transmission pathway is formed, and the subsequent modification does not affect or alter the low resistance structure of the "silver-silver contact," and therefore does not have a negative effect on the electrical characteristics of the end product. In one example, a region or a structural layer with the following sheet resistance range is considered to be electrical insulation when the sheet resistance is higher than 108 ohm/square, preferably is higher than 104 ohm/square, 3,000 ohm/square, 1,000 ohm/square, 350 ohm/square, or 100 ohm/square.

In examples of the present disclosure, the dispersion may be water, alcohols, ketones, ethers, hydrocarbons, or an aromatic solvent (such as benzene, toluene, and xylene, but not limited thereto). The dispersion may also include an additive, a surfactant, or an adhesive, such as carboxymethyl cellulose (CMC), hydroxyethyl cellulose (HEC), hydroxypropyl methylcellulose (HPMC), sulfonate ester, sulfate ester, disulfonate salts, sulfosuccinic acid ester, phosphate ester, or a fluorine-containing surfactant, etc. The dispersion or ink including the metal nanowires 190 may be formed on surfaces of the substrate 110 and the metal layer ML, such as but not limited to a screen printing process, a spray coating process, or a roller coating process. In one example, the dispersion or ink including the metal nanowires 190 may be coated on the surface of the substrate 110 and the metal layer ML in continuous supply by a roll-to-roll (RTR) process.

The term "metal nanowire(s)" in the present disclosure is a collective noun that refers to a set of metal wires including a plurality of elemental metals, metal alloys, or metal compounds (including metal oxides). The number of metal nanowires does not limit the scope of the present disclosure. A dimension of at least one cross-sectional area of the metal nanowires (i.e., the diameter of the cross-sectional area) is below 500 nm, preferably below 100 nm, and more preferably below 50 nm. The so-called "wire(s)" of the metal nanostructure in the present disclosure has a high aspect ratio, such as 10 to 100,000. Specifically, the aspect ratio (i.e., the ratio of the length to the diameter of the cross-sectional area) of the metal nanowires may be 10 and above, preferably 50 and above, more preferably 100 and above. The metal nanowires may be any metals, including but not limited to silver, gold, copper, nickel, and a silver material coated with gold. Other terms such as "silk," "fiber," or "tube" having a dimension and an aspect ratio within the aforementioned value ranges are also included in the scope of the present disclosure.

Reference is made to FIG. 2C. A modification step is performed to form the metal nanowire layer NWL including the modified metal nanowires 190. In other words, after the modification, at least some of the initial metal nanowires 190 in the metal nanowire layer NWL are modified, such that the covering structure 180 is formed on the surface for forming the modified metal nanowires 190. In one specific example, the covering structure 180 may be formed by coating, chemical plating, electroplating, or sputtering, and the covering structure 180 may be a layered structure, an island-shaped protrusion structure, or a point-shaped protrusion structure which are made of a conductive material, or a combination thereof. A coverage percentage accounts for 0.1-10% of the total surface area of the nanowires. The conductive material may be silver, gold, platinum, copper, iridium, rhodium, palladium, or osmium, etc., or graphene, carbon nanotubes, conductive polymers (such as poly(3,4-ethylenedioxythiophene) polystyrene sulfonate (PEDOT: PSS)), or conductive oxides (such as ITO), etc. In one specific example, the following solution may be prepared to deposit palladium on the metal nanowires 190 to form the covering structure 180. The solution includes a palladium precursor such as but not limited to $PdSO_4$, $PdCl_2$, $Pd(NO_3)_2$, $Pd(SCN)_2$, etc., which is dissolved in an acidic/neutral/alkaline solvent such as sulfuric acid, nitric acid, NaOH, $NaH_2PO_2$, $KIO_3$, ethylenediamine, etc. The solution may include a low content of stabilizer, reducing agent, or chelating agent.

It is noted that the modification step is performed after the film-forming of the metal nanowire layer NWL. The metal nanowires 190 after the film-forming substantially form a lap joint aspect where they contact each other. In other words, a surface of the metal nanowires 190 (i.e., the first surface 191) directly contacts with the first surface 191 of another metal nanowire 190, and therefore the covering structure 180 formed by the modification step is not formed on the first surface 191 and is selectively formed on other exposed surfaces (i.e., the second surface 192). Accordingly, the covering structure 180 formed by the modification step does not have a negative impact on the conductive path that is already formed in a lap joint, thereby maintaining the low-resistance transmission path formed by the metal nanowires 190.

Next, a patterning step is performed, as shown in FIG. 2D. The patterning step is mainly to form an electrode structure, in which a pattern is defined in the metal nanowire layer NWL formed of the modified metal nanowires 190 on the display region VA, such that an electrode structure is formed. Similarly, a pattern is defined in the metal nanowire layer NWL and the metal layer ML on the peripheral region PA, such that an electrode structure is formed. The electrode structures in these two regions form an electrode set that may be applied for touch-sensing. For clarity of the drawings, the label "V" is not shown in FIG. 2D, and the second surface 192 (that is, the exposed surface with the covering structure 180 formed thereon) of the modified metal nanowires 190 on the display region VA is depicted in an enlarged view. The lap joint pattern between the metal nanowires 190 is also not shown in FIG. 2D. From FIG. 1A, FIG. 1B, and FIG. 2D, it may be seen that all of the touch-sensing electrode TE, the first covers C1, and/or the second cover C2 include the modified metal nanowires 190 therein.

In one example, using an etching liquid that can simultaneously etch the metal nanowire layer NWL of the modified metal nanowires 190 and the metal layer ML is used on the peripheral region PA and an etching mask (such as photoresist), the metal layer ML and the metal nanowire layer NWL with patterns are prepared in the same process by one step. As shown in FIG. 2D, FIG. 1, and FIG. 1A, the metal layer ML with a pattern on the peripheral region PA is the peripheral leads 120, and the metal nanowire layer NWL with a pattern is the etching layer. In the present example, since the etching layer is located on the peripheral leads 120, the peripheral leads 120 can therefore be referred to as the first covers C1. In other words, after the patterning step, the first covers C1 including the second portion of the metal nanowire layer NWL and the peripheral leads 120 including the metal layer ML are formed on the peripheral region PA.

In another example, the etching layer including the second portion of the metal nanowire layer NWL and the peripheral leads 120 and the mark 140 including the metal layer ML are formed on the peripheral region PA (see FIG. 1, FIG. 1A, and FIG. 1B). The etching layer may include the first covers C1 and the second cover C2. The first covers C1 are disposed on the corresponding peripheral leads 120. The second cover C2 is disposed on the corresponding mark 140. Because the single-step etching is used, the sidewall 122 of the peripheral leads 120 and a side surface C1L of the first covers C1 are surfaces that are concurrently etched and are aligned with each other. In other words, the sidewall 122 of the peripheral leads 120 and the side surface C1L of the first covers C1 are formed in the same etching step. Similarly, a sidewall 142 of the mark 140 and a side surface C2L of the second cover C2 are surfaces that are concurrently etched and are aligned with each other.

In one example, the ability to simultaneously etch the metal nanowire layer NWL and the metal layer ML means that the ratio of the etching rate of the metal nanowire layer NWL to the metal layer ML is about 0.1-10 or 0.01-100.

According to one example, the metal nanowire layer NWL includes silver nanowires and has the covering structure 180 including palladium disposed on surfaces thereof at non-intersections. In the case where the metal layer ML is a copper layer, the etching liquid may have a component that may be used for etching copper and silver. For example, the main component of the etching liquid is $H_3PO_4$ (with a percentage of about 55 vol. % to 70 vol. %) and $HNO_3$ (with a percentage of about 5 vol. % to 15 vol. %) to remove copper and silver in the same process. In another specific example, an additive, such as an adjuster for adjusting the etching selection ratio, may be added to the etching liquid in addition to the main component to adjust the rates of etching copper and silver. For example, 5 vol. % to 10 vol. % of benzotriazole (BTA) may be added to an etching liquid with a main component of $H_3PO_4$ (with a percentage of about 55 vol. % to 70 vol. %) and $HNO_3$ (with a percentage of about 5 vol. % to 15 vol. %) to solve the problem of copper over-etching. In another specific example, the main component of the etching liquid may be ferric chloride/nitric acid or phosphoric acid/hydrogen peroxide, etc.

The patterning step may further include simultaneously patterning the metal nanowire layer NWL on the display region VA. In other words, as shown in FIG. 2D, an etching mask (such as a photoresist) may also be used, along with the use of the etching liquid to pattern the first portion of the metal nanowire layer NWL on the display region VA to fabricate the touch-sensing electrode TE of the present example on the display region VA. The touch-sensing electrode TE may be electrically connected to the peripheral leads 120. Specifically, the touch-sensing electrode TE may be the metal nanowire layer NWL including at least the modified metal nanowires 190. Overall, the patterned metal nanowire layer NWL forms the touch-sensing electrode TE on the display region VA and forms the first covers C1 on the peripheral region PA. Therefore, the touch-sensing electrode TE may be electrically connected to the peripheral leads 120 via the connection between the first covers C1 and the peripheral leads 120 to transmit signals. In the present example, the metal nanowire layer NWL may form the second cover C2 on the peripheral region PA and is disposed at an upper surface of the mark 140 (as shown in FIG. 1A). The mark 140 may be generally interpreted as a pattern for non-electrical functions, but is not limited thereto. In some examples of the present disclosure, the peripheral leads 120 and the mark 140 may be made of the same layer of the metal layer ML (that is, both are made of the same metal material, such as the aforementioned chemical electroplated copper layer or sputtered copper layer). The touch-sensing electrode TE, the first covers C1, and the second cover C2 may be made of the same layer of the metal nanowire layer NWL. For clarity, the covering structure 180 is shown on the touch-sensing electrode TE, the first covers C1, and the second cover C2 in FIG. 1A and FIG. 1B to indicate that each of the touch-sensing electrode TE, the first covers C1, and the second cover C2 include the modified metal nanowires 190.

In a variant example, the metal nanowire layer NWL on the display region VA and the peripheral region PA may be patterned by different etching steps (that is, using different etching liquids). Accordingly, in the case where the metal nanowire layer NWL is a silver nanowire layer and the metal layer ML is a copper layer, the etching liquid used for the display region VA may be an etching liquid that can only etch silver. For example, the selected etching liquid has a higher etching rate for silver than for copper by about 100 times, about 1000 times, or about 10000 times.

The touch panel 100 shown in FIG. 1 to FIG. 1B may be manufactured by the foregoing steps. For example, the patterned metal nanowire layer NWL on the display region VA forms the touch-sensing electrode TE of the touch panel 100, while the patterned metal layer ML on the peripheral region PA forms the peripheral leads 120 of the touch panel 100. The patterned metal nanowire layer NWL forms an etching layer (such as the first covers C1). The peripheral leads 120 and the first covers C1 are laminated to form a conductive path on the peripheral region PA to connect with an external controller.

In the present example, the first covers C1 and the second cover C2 may be the metal nanowire layer NWL including at least the modified metal nanowires 190, such as a modified silver nanowire layer, a modified gold nanowire layer, or a modified copper nanowire layer.

The touch-sensing electrode TE of the present example is disposed on the display region VA. The touch-sensing electrode TE may be electrically connected to the peripheral leads 120. Specifically, the touch-sensing electrode TE may similarly be the metal nanowire layer NWL including at least the modified metal nanowires 190. In other words, the metal nanowire layer NWL forms the touch-sensing electrode TE on the display region VA and the first covers C1 on the peripheral region PA. Therefore, the touch-sensing electrode TE may be electrically connected to the peripheral leads 120 by the connection between the first covers C1 and the peripheral leads 120 to transmit signals.

The metal nanowires 190 on the peripheral region PA also form the second cover C2. The mark 140 is disposed between the corresponding second cover C2 and the substrate 110. In some examples of the present disclosure, the peripheral leads 120 and the mark 140 may be made of the same layer of a metal layer ML (that is, they are the same metal material) and are formed in the same patterning step. The touch-sensing electrode TE, the first covers C1, and the second cover C2 may be made of the same layer of metal nanowire layer NWL and are formed in the same patterning step.

Reference is made to FIG. 1A. As shown in FIG. 1A, the first covers C1 and the second cover C2 are respectively formed and cover upper surfaces 124 of the peripheral leads 120 and an upper surface 144 of the mark 140. In some embodiments of the present disclosure, the metal nanowires may be silver nanowires. For the convenience of description, the cross-section of the peripheral leads 120 and the mark 140 herein is a quadrilateral (for example, the rectangle depicted in FIG. 1A). However, the structural form or the number of sidewalls 122 and upper surfaces 124 of the peripheral leads 120, as well as the structural form or the number of sidewalls 142 and upper surfaces 144 of the mark 140 may vary according to actual applications and are not limited by the description and drawings herein.

In the present example, the mark 140 is disposed in a bonding area BA of the peripheral region PA (see FIG. 1) and is an abutting alignment mark. That is, the mark 140 is a symbol for aligning the flexible circuit board and the touch panel 100 in a step of connecting an external circuit board, such as a flexible circuit board, to the touch panel 100 (i.e., a bonding step). However, the position or functions of the mark 140 are not limited in the present disclosure. For example, the mark 140 can be any verification mark, pattern, or label required in the manufacturing process, which are all fall within the scope of the present disclosure. The mark 140 may have any possible shape, such as circle, quadrilateral, cross, L-shape, T-shape, etc., but is not limited thereto. In addition, the portion of the peripheral leads 120 extending to the bonding area BA can be referred to as a bonding section. As with the previous example, an upper surface of the bonding section in the bonding area BA is also covered by the first covers C1.

As shown in FIG. 1A and FIG. 1B, on the peripheral region PA, a non-conductive region 136 is located between the adjacent peripheral leads 120 to electrically isolate the adjacent peripheral leads 120 and further avoid short circuit. In other words, the non-conductive region 136 is located between sidewalls 122 of the adjacent peripheral leads 120. In the present example, the non-conductive region 136 is a gap to isolate the adjacent peripheral leads 120. In the step of disposing the first covers C1 on the peripheral leads 120, the gap may be fabricated by etching, such that the sidewalls 122 of the peripheral leads 120 and the side surfaces C1L of the first covers C1 are coplanar after etching. In other words, the sidewalls 122 of the peripheral leads 120 and the side surfaces C1L of the first covers C1 are formed in the same etching step. Similarly, the sidewall 142 of the mark 140 and the side surface C2L of the second cover C2 are coplanar after etching. In one example, there is no metal nanowire on the sidewalls 122 of the peripheral leads 120 and the sidewall 142 of the mark 140 because of the etching step. More specifically, in the bonding area BA shown in FIG. 1A, the non-conductive region 136 is located between the adjacent bonding sections, and the sidewalls 122 of the peripheral leads 120 in the bonding section and the side surfaces C1L of the first covers C1 are coplanar after etching. Furthermore, the peripheral leads 120 and the first covers C1 have the same or similar patterns and dimensions, such as long and straight patterns, and the widths may also be the same or similar. The mark 140 and the second cover C2 may also have the same or similar patterns and dimensions, such as circles with the same or similar radius, quadrilaterals with the same or similar side length, or other similar or similar cross-shaped, L-shaped, T-shaped patterns, etc.

As shown in FIG. 1B, on the display region VA, the non-conductive region 136 is located between the adjacent touch-sensing electrodes TE to electrically isolate the adjacent touch-sensing electrodes TE and further avoid short circuit. In other words, the non-conductive region 136 is located between sidewalls of the adjacent touch-sensing electrodes TE. In the present example, the non-conductive region 136 is a gap to isolate the adjacent touch-sensing electrodes TE. In one example, the gap between the adjacent touch-sensing electrodes TE may be formed by etching. In the present example, the touch-sensing electrode TE and the first covers C1 may be made of the same layer of metal nanowire layer NWL (such as silver nanowire layer). Therefore, at an interface of the display region VA and the peripheral region PA, the metal nanowire layer NWL forms a hill-climbing structure, such that the metal nanowire layer is formed on and covers upper surfaces 124 of the peripheral leads 120, and thereby forms the first covers C1, as shown in FIG. 1B.

In some embodiments of the present disclosure, the first covers C1 and the second cover C2 of the touch panel 100 are respectively etched and disposed on the upper surfaces 124 of the peripheral leads 120 and the upper surface 144 of the mark 140, such that the requirement of providing an alignment error region in the manufacturing process is reduced or avoided, thereby reducing the width of the peripheral region PA and further fulfilling the requirement of a narrow bezel of the display device. Specifically, in some embodiments of the present disclosure, the peripheral lead 120 of the touch panel 100 has a width of 5 µm-30 µm, and a distance between the adjacent peripheral leads 120 is 5 µm-30 µm. Alternatively, the width of the peripheral leads 120 of the touch panel 100 is 3 µm-20 µm, and the distance between the adjacent peripheral leads 120 is 3 µm-20 µm. The width of the peripheral region PA may also be less than 2 mm. Compared with the traditional touch panel 100, the dimension of the peripheral region PA is reduced by about 20% or more.

As shown in FIG. 1, the touch-sensing electrodes TE are arranged in a non-interlaced arrangement. For example, the touch-sensing electrodes TE are elongated electrodes extending along a first direction D1 and having a width change in a second direction D2 without crossing with each other. However, in other embodiments, the touch-sensing electrode TE may have any suitable shape, and the scope of the present disclosure shall not be limited thereto. In the present embodiment, the touch-sensing electrode TE adopts a single-layer configuration, where the touch position can be obtained by detecting changes in the capacitance value of each of the touch-sensing electrodes TE.

Figure 3A:
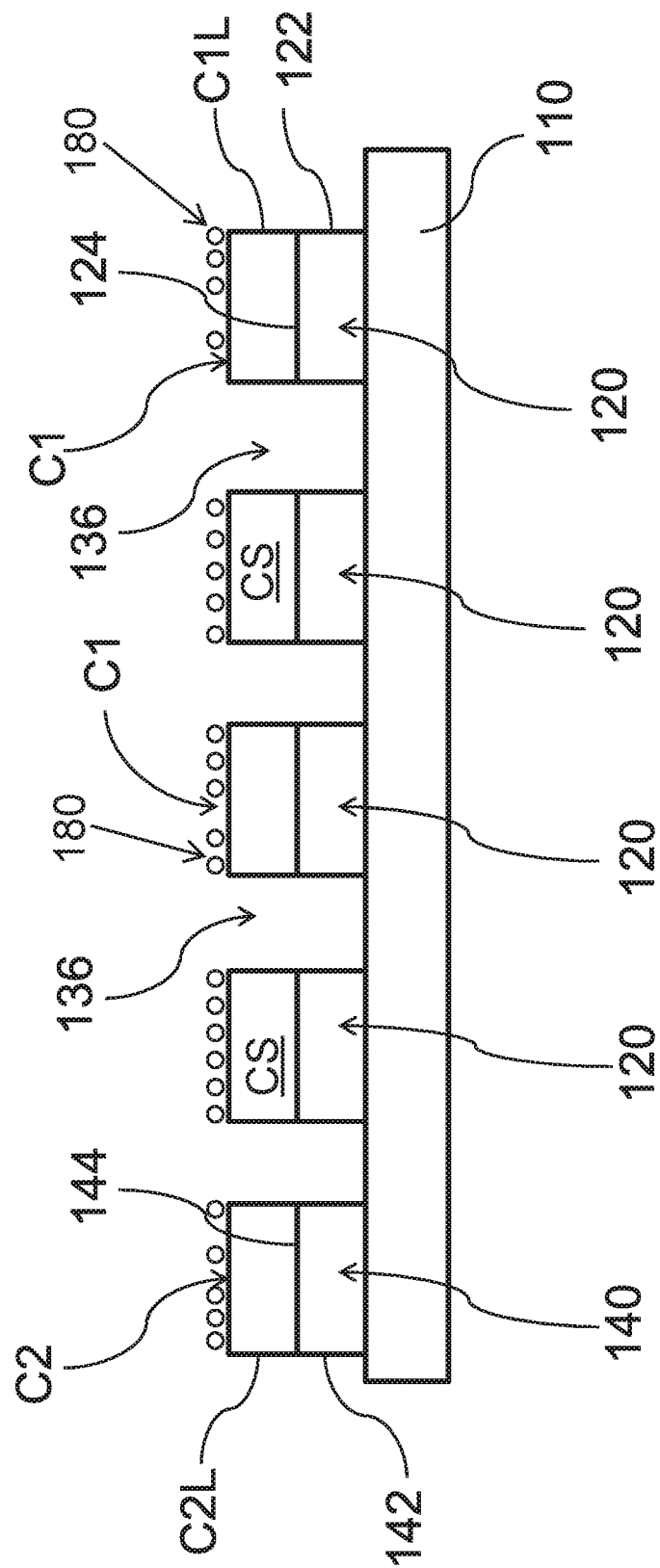
FIG. 3A is a cross-sectional schematic view of a variant example along line A-A of FIG. 1.
Figure 3B:
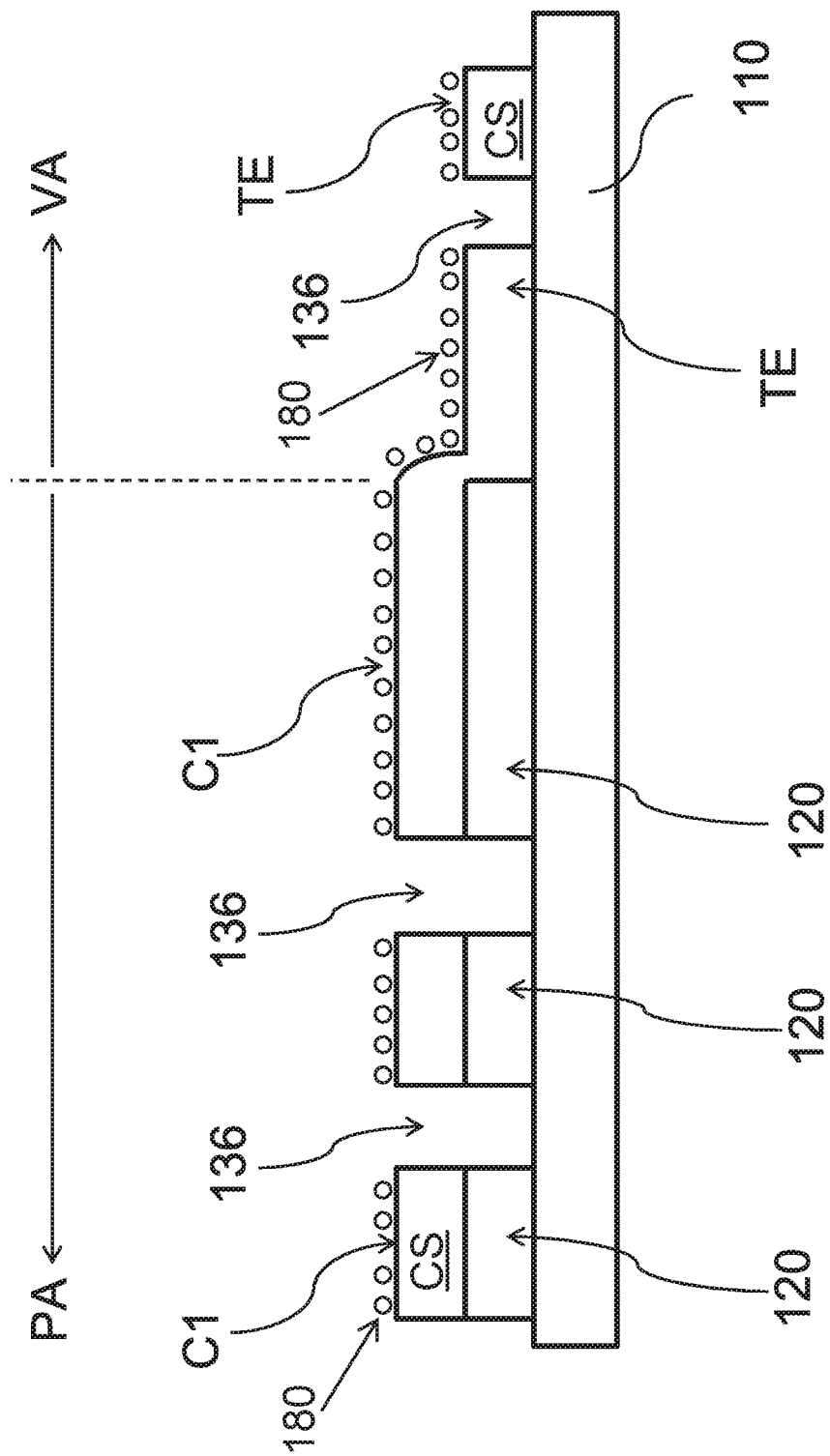
FIG. 3B is a cross-sectional schematic view of a variant example along line B-B of FIG. 1.

In one example, the touch panel 100 may include a film layer 130. FIG. 3A and FIG. 3B are cross-sectional schematic views after forming the film layer 130 on the example shown in FIG. 1. In one example, the film layer 130 is disposed on the unmodified metal nanowires 190, such that the unmodified metal nanowires 190 are covered by the film layer 130. The aforementioned modification step and patterning step are subsequently performed. In one specific example, the polymer of the film layer 130 in an uncured or pre-cured state may permeate between the metal nanowires 190 to form a filler. When the polymer is cured, the metal nanowires 190 are embedded in the film layer 130 to form the composite structure CS. By means of controlling coating and curing conditions of the polymer, the thickness of the film layer 130 (such as less than 100 nanometers) allows some of the unmodified metal nanowires 190 to be exposed. In other words, before the modification step, some of the metal nanowires 190 are embedded in the film layer 130, the embedded unexposed metal nanowires 190 and the film layer 130 form the composite structure CS, and the metal nanowires 190 may further have an exposed portion exposed or protruding from the film layer 130. In the subsequent modification step, only the exposed portion is treated by the previous method to form the modified metal nanowires 190, while the unmodified metal nanowires 190 embedded in the film layer 130 remain in the initial state and are not affected by the modification step. In some embodiments of the present disclosure, the film layer 130 is formed of insulating material. For example, the material of the film layer 130 may be a non-conductive resin or other organic material. In some embodiments of the present disclosure, the film layer 130 may be formed by spin-coating, spray-coating, printing, etc. In some embodiments, a thickness of the film layer 130 is about 20 nanometers to 10 micrometers, or 50 nanometers to 200 nanometers, or 30 to 100 nanometers. For example, the thickness of the film layer 130 may be about 90 nanometers or 100 nanometers.

As shown in FIG. 3A and FIG. 3B, on the peripheral region PA, the exposed metal nanowires 190 exposed or protruding from the film layer 130 have the covering structure 180 due to the modification step. For the simplicity of drawings, the covering structure 180 is depicted on the outside of the film layer 130 (or the composite structure CS) to indicate that the metal nanowires 190 exposed or protruding from the film layer 130 have the covering structure 180 due to the modification step. The metal nanowires 190 are omitted in the film layer 130 (or the composite structure CS). Moreover, the unmodified metal nanowires 190 embedded in the film layer 130 and the film layer 130 may form a transparent and conductive composite structure CS. After the etching step, the composite structure CS and the modified metal nanowires 190 form the first covers C1 and the second cover C2. In other words, in the present example, the first covers C1 and the second cover C2 have the unmodified metal nanowires 190 (i.e., the metal nanowires 190 embedded in the film layer 130) and the modified metal nanowires 190 (i.e., the metal nanowires 190 exposed from the film layer 130). The peripheral leads 120 are in contact with the composite structure CS to achieve the transmission of electrical signals.

As shown in FIG. 3B, on the display region VA, the exposed metal nanowires 190 exposed or protruding from the film layer 130 have the covering structure 180 due to the modification step. For the simplicity of drawings, the covering structure 180 is depicted on the outside of the film layer 130 (or the composite structure CS) to indicate that the metal nanowires 190 exposed or protruding from the film layer 130 have the covering structure 180 due to the modification step. Moreover, the unmodified metal nanowires 190 embedded in the film layer 130 and the film layer 130 may form a transparent and conductive the composite structure CS. After the etching step, the composite structure CS and the modified metal nanowires 190 form the touch-sensing electrode TE. In other words, in the present example, the touch-sensing electrode TE has the unmodified metal nanowires 190 (i.e., the metal nanowires 190 embedded in the film layer 130) and the modified metal nanowires 190 (i.e., the metal nanowires 190 exposed from the film layer 130), and the modified metal nanowires 190 are exposed or protruding from the composite structure CS.

In the present embodiment, the combined structure of the composite structure CS and the modified metal nanowires 190 on the display region VA has improved electrical conductivity and transparency. For example, the visible light (for example, the wavelength is between about 400 nm-700 nm) transmission of the touch-sensing electrode TE may be greater than about 80%, and the sheet resistance ranges from about 10 to 1000 ohm/square. Alternatively, the visible light (for example, the wavelength is between about 400 nm-700 nm) transmission of the touch-sensing electrode TE is greater than about 85%, and the sheet resistance ranges from about 50 to 500 ohm/square. In one example, the visible light (for example, the wavelength is between about 400 nm-700 nm) transmission of the touch-sensing electrode TE is greater than about 88% or greater than about 90%. In one example, the touch-sensing electrode TE has a haze of less than 3.0, 2.5, 2.0, or 1.5.

In some embodiments of the present disclosure, the film layer 130 may be polyethylene(PE), polypropylene(PP), polyvinyl butyral (PVB), polycarbonate (PC), acrylonitrile butadiene styrene (ABS), poly(3,4-ethylenedioxythiophene) (PEDOT), poly(styrenesulfonate) (PSS), or ceramic material, etc. In one embodiment of the present disclosure, the film layer 130 may be one or more of the following polymers, but is not limited thereto: polyacrylic resins, such as polymethacrylates (for example, polymethylmethacrylate), polyacrylates, and polyacrylonitrile; polyvinyl alcohol; polyester (for example, polyethylene terephthalate (PET), polyester naphthalate, and polycarbonate); a polymer having a high aromaticity, such as phenolic resins, cresol-formaldehyde, polystyrene, polyvinyl toluene, polyvinylxylene, polyimide, polyamide, polyamideimide, polyetherimide, polysulfide, polysulfone, polyphenylene, and polyphenylene ether; polyurethane (PU); epoxy resin; polyolefins (for example, polypropylene, polymethylpentene, and cycloolefins); cellulose; polysilicone and other silicon-containing polymers (for example, polysilsesquioxanes and polysilanes); polyvinyl chloride (PVC); polyacetate ester; polynorbornene; synthetic rubber (for example, ethylene-propylene rubber (EPR), styrene-butadiene rubber (SBR), ethylene-propylene-diene monomer (EPDM) and fluorine-containing polymers (for example, polyvinylidene fluoride, polytetrafluoroethylene (TFE) or polyhexafluoropropylene); a copolymer of fluorine-olefins and hydrocarbon olefin, and the like. In other examples, inorganic materials such as silica, mullite, alumina, SiC, carbon fibers, $MgO-Al_2O_3-SiO_2$, $Al_2O_3-SiO_2$, $MgO-Al_2O_3-SiO_2-Li_2O$, etc., may be used.

In some embodiments, the metal nanowires 190 as formed may be post-treated to increase the contact characteristics of the metal nanowires 190 at intersections. For example, the contact area is increased to enhance electrical conductivity. The post-treatment may include process steps such as heating, plasma, corona discharge, ultraviolet (UV) ozone, pressure, or a combination thereof. For example, after the curing step for forming the metal nanowire layer NWL, a roller may be used to apply pressure thereon. In one example, the metal nanowire layer NWL may be applied with a pressure of 50 to 3400 psi, preferably 100 to 1000 psi, 200 to 800 psi, or 300 to 500 psi, by using one or more rollers. The pressure applying step is preferably performed before the step of coating the film layer 130. In some embodiments, post-processing, such as heating and pressure, can be performed simultaneously. In detail, the metal nanowires 190 as formed may be applied with pressure by using one or more rollers and are heated at the same time. For example, the pressure applied by the roller is 10 to 500 psi, preferably 40 to 100 psi, and meanwhile the one or more rollers are heated to between about 70° C. and 200° C., preferably to between about 100° C. and 175° C., such that the electrical conductivity of the metal nanowires 190 can be increased. In some embodiments, the metal nanowires 190 may be preferably exposed to a reducing agent for post-treatment. For example, the metal nanowires 190 including the silver nanowires is preferably exposed to a silver reducing agent for post-treatment. The silver reducing agent includes borohydrides, such as sodium borohydride; boron-nitrides, such as dimethylaminoborane (DMAB); or gas reducing agents, such as hydrogen ($H_2$). The exposure time is about 10 seconds to about 30 minutes, preferably about 1 minute to about 10 minutes. After the post-processing steps, the contact strength or area of the metal nanowires 190 at the intersections may be increased, and the contact surface of the metal nanowires 190 at the intersections (i.e., the first surfaces 191) is not affected by the modification.

In one example, after the modification step, the film layer 130 is disposed on the modified metal nanowires 190, such that the modified metal nanowires 190 are covered by the film layer 130, followed by performing the patterning step. In one specific example, the uncured or pre-cured polymer of the film layer 130 may penetrate between the metal nanowires 190 to form a filler. After the polymer is cured, the metal nanowires 190 are embedded in the film layer 130 to form the composite structure CS. By means of controlling conditions of coating and the polymer, the thickness of the film layer 130 (such as less than 100 nm) allows some of the modified metal nanowires 190 to be exposed. Alternatively, the thickness of the film layer 130 is increased to completely wrap the modified metal nanowires 190. In other words, in the present example, both the metal nanowires 190 exposed from the film layer 130 and the metal nanowires 190 embedded in the film layer 130 are included in aspects of modification.

Figure 4A:
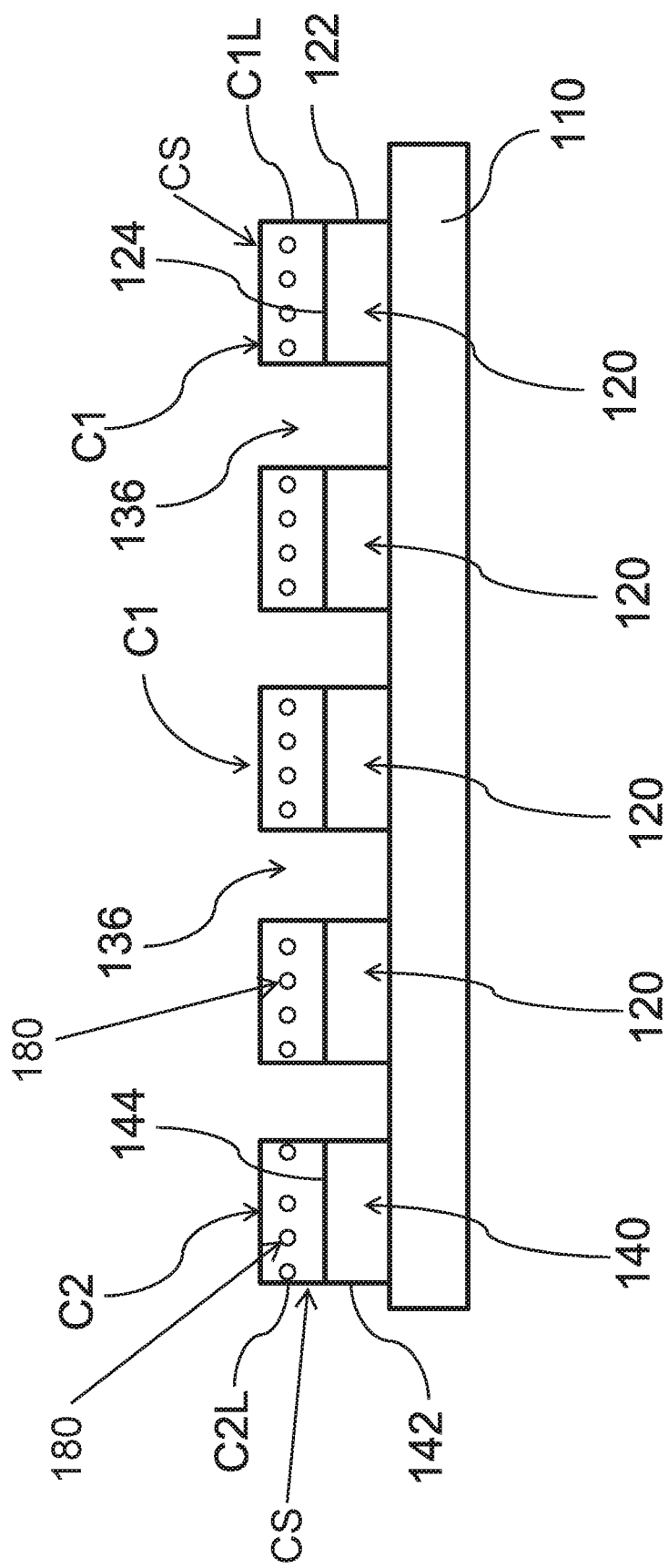
FIG. 4A is a cross-sectional schematic view of another variant example along line A-A of FIG. 1.
Figure 4B:
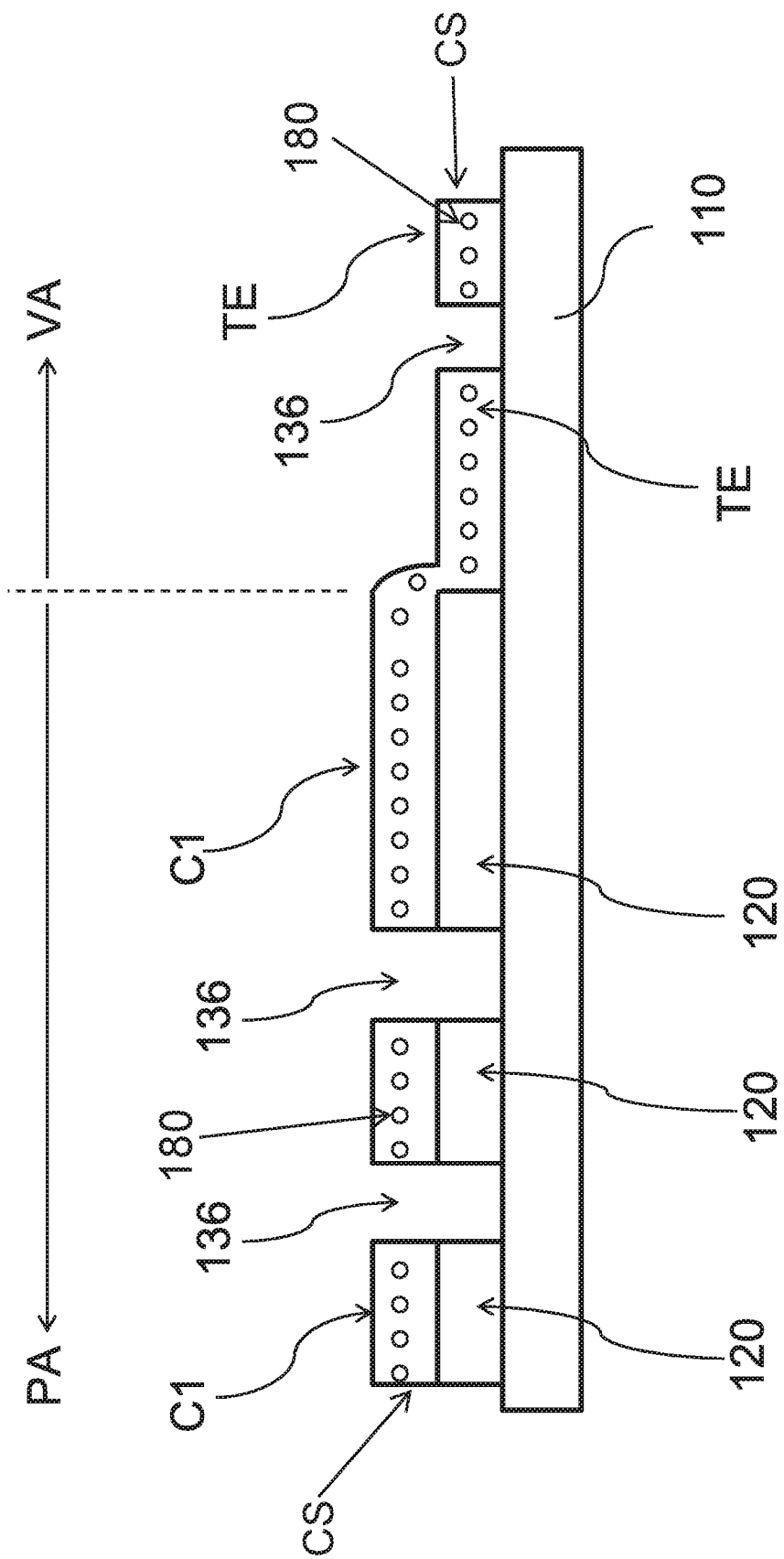
FIG. 4B is a cross-sectional schematic view of another variant example along line B-B of FIG. 1.

As shown in FIG. 4A and FIG. 4B, on the peripheral region PA, the exposed metal nanowires 190 embedded in the film layer 130 have the covering structure 180 due to the modification step. The covering structure 180 is depicted in the film layer 130 (or the composite structure CS) to indicate that the metal nanowires 190 embedded in the film layer 130 have the covering structure 180 due to the modification step. For the simplicity of drawings, the modified metal nanowires 190 exposed from the film layer 130 are not shown in FIG. 4A and FIG. 4B. Furthermore, the modified metal nanowires 190 embedded in the film layer 130 and the film layer 130 may form a transparent and conductive composite structure CS. After the etching step, the composite structure CS is then patterned to form the first covers C1 and the second cover C2. In other words, in the present example, the first covers C1 and the second cover C2 both have the composite structure CS formed of the modified metal nanowires 190 and the film layer 130, while the peripheral leads 120 and the composite structure CS are in contact to achieve the transmission of electrical signals.

As shown in FIG. 4B, on the display region VA, the covering structure 180 is depicted in the film layer 130 (or the composite structure CS) to indicate that the metal nanowires 190 embedded in the film layer 130 have the covering structure 180 due to the modification step. The modified metal nanowires 190 embedded in the film layer 130 and the film layer 130 may form a transparent and conductive composite structure CS. After the etching step, the composite structure CS forms the touch-sensing electrode TE. In other words, in the present example, the touch-sensing electrode TE has the composite structure CS formed of the modified metal nanowires 190 and the film layer 130.

The touch panel 100 of another embodiment of the present disclosure may be manufactured in the following manner. First, the substrate 110 with previously defined peripheral region PA and display region VA is provided. Then the metal layer ML is formed on the peripheral region PA. Next, the unmodified metal nanowires 190 are disposed on the substrate 110 to form the metal nanowire layer NWL on the peripheral region PA and the display region VA. The modified metal nanowires 190 each have a first surface 191 in direct contact with a first surface of another modified metal nanowire at an intersection and a second surface 192 at a non-intersection. Then a patterning step is performed to form the metal layer ML and the metal nanowire layer NWL with a pattern. A modification step is then performed. The covering structure 180 is disposed on the second surface of the modified metal nanowires 190, in which the metal nanowire layer NWL located on the display region VA is patterned to form the touch-sensing electrode TE. Also, due to the modification step, the touch-sensing electrode TE includes the modified metal nanowires 190. Although the sequence of steps in the present example is different from the previous examples, the specific details of the similar steps are provided above and are not repeated herein.

Figure 5A:
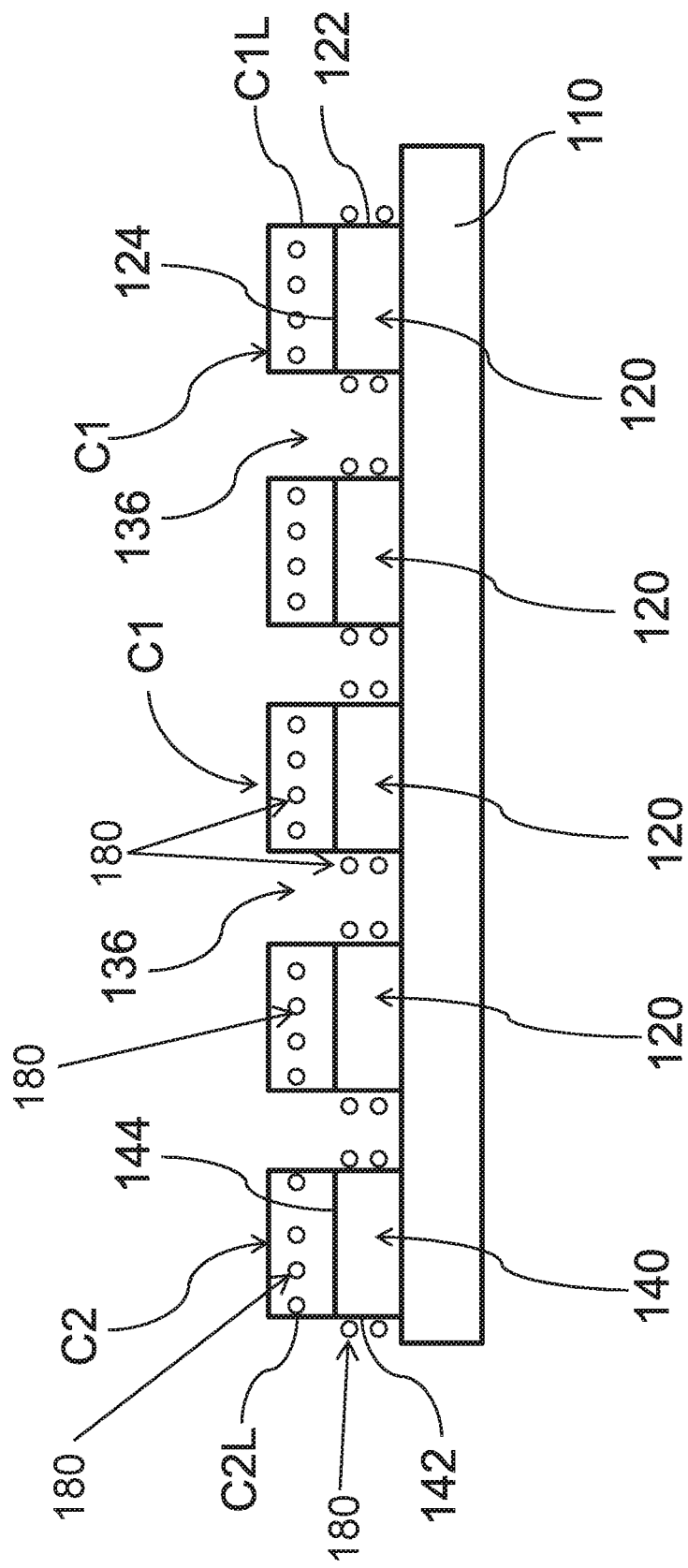
FIG. 5A is a cross-sectional schematic view of another variant example along line A-A of FIG. 1.
Figure 5B:
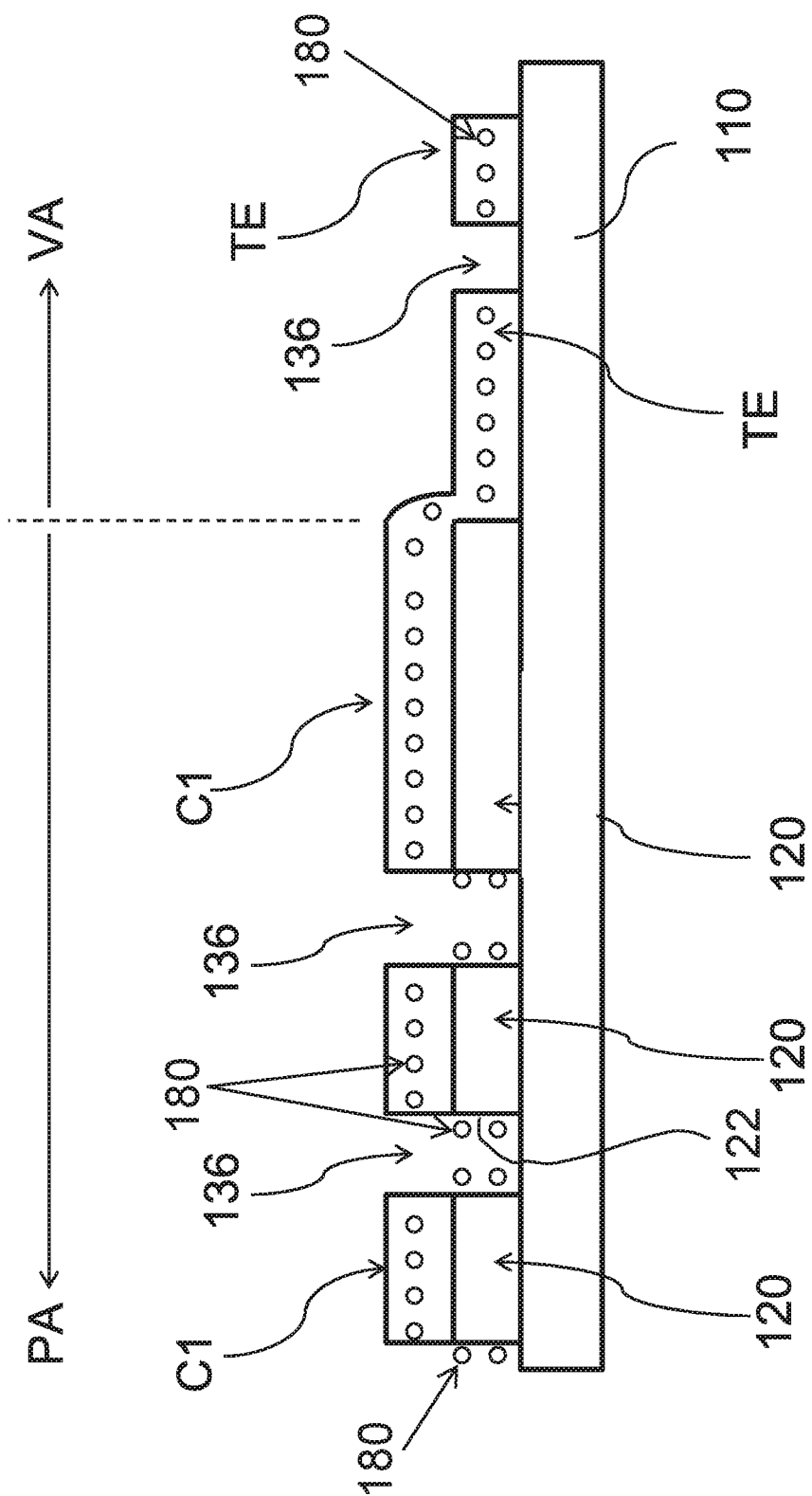
FIG. 5B is a cross-sectional schematic view of another variant example along line B-B of FIG. 1.

The touch panel 100 shown in FIG. 5A to FIG. 5B is the touch panel 100 manufactured by steps of the present example. In the present example, the first covers C1 and the second cover C2 may be the metal nanowire layer NWL including at least the modified metal nanowires 190, such as a modified silver nanowire layer, a modified gold nanowire layer, or a modified copper nanowire layer. The touch-sensing electrode TE, the first covers C1 and the second cover C2 may be fabricated by the same layer of the metal nanowire layer NWL. For clarity, the covering structure 180 is depicted in the touch-sensing electrode TE shown in FIG. 5A and FIG. 5B to indicate that the metal nanowires 190 in the touch-sensing electrode TE are modified. Similarly, the covering structure 180 is depicted in the first covers C1 and the second cover C2 to indicate that the metal nanowires 190 in the first covers C1 and the second cover C2 are modified.

As shown in FIG. 5B, the touch-sensing electrode TE of the present example is mainly disposed on the display region VA. The touch-sensing electrode TE may be electrically connected to the peripheral leads 120. Similar to the previous example, the touch-sensing electrode TE may be the metal nanowire layer NWL including at least the modified metal nanowires 190. In other words, the metal nanowire layer on the display region VA is patterned first and is then modified to form the touch-sensing electrode TE.

As shown in FIG. 5A and FIG. 5B, since the modification step is performed after the patterning step, the first covers C1 are formed of the modified metal nanowires 190 and are disposed on the upper surfaces 124 of the peripheral leads 120. The second cover C2 is formed of the modified metal nanowires 190 and is disposed on the upper surface 144 of the mark 140. Moreover, the modification step may form the covering structure 180 on an exposed surface of the peripheral leads 120. For example, the covering structure 180 is formed on the sidewalls 122 of the peripheral leads 120.

Similarly, the modification step may form the covering structure 180 on an exposed surface of the mark 140. For example, the covering structure 180 is formed on the sidewall 142 of the mark 140.

The touch panel 100 of another embodiment of the present disclosure may be manufactured by the following method. First, the substrate 110 having the pre-defined the peripheral region PA and display region VA is provided. Next, the metal layer ML is formed on the peripheral region PA. Subsequently, the unmodified metal nanowires 190 are disposed on the substrate 110 to form the metal nanowire layer NWL on the peripheral region PA and the display region VA. The modified metal nanowires 190 each have a first surface 191 in direct contact with a first surface of another modified metal nanowire at an intersection and a second surface 192 at a non-intersection. After that, the film layer 130 is formed, and film layer 130 and the metal nanowires 190 may form the composite structure CS. After that, a patterning step is performed to form the metal layer ML and the metal nanowire layer NWL having patterns. Then, a modification step is performed. The covering structure 180 is disposed on the second surface of the modified metal nanowires 190, in which the metal nanowire layer NWL located on the display region VA is patterned to form the touch-sensing electrode TE. Due to the modification step, the touch-sensing electrode TE is composed of the unmodified and the modified metal nanowires 190 collectively. Although the sequence of the steps in the present example is different from the previous example, the specific details of similar steps are provided in the previous description and therefore are not repeated herein.

Figure 6A:
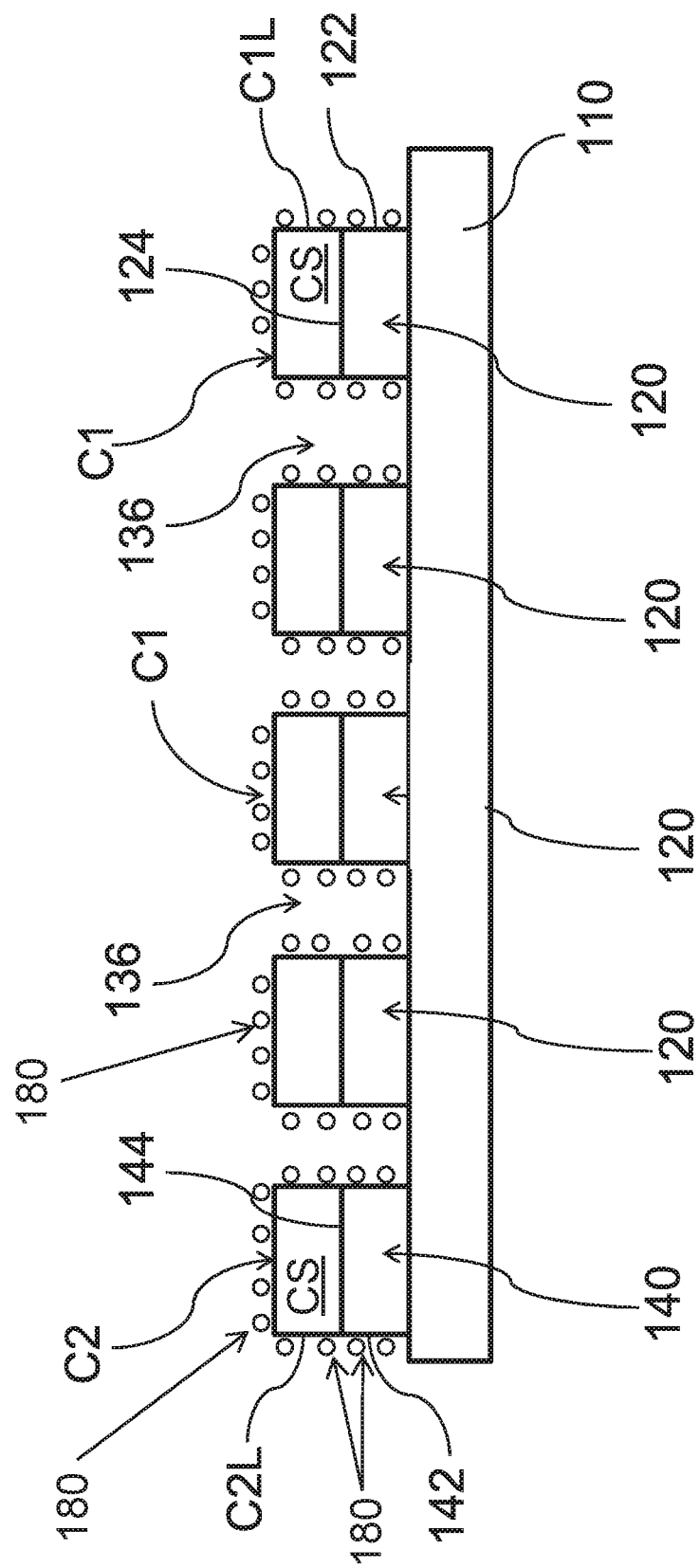
FIG. 6A is a cross-sectional schematic view of another variant example along line A-A of FIG. 1.
Figure 6B:
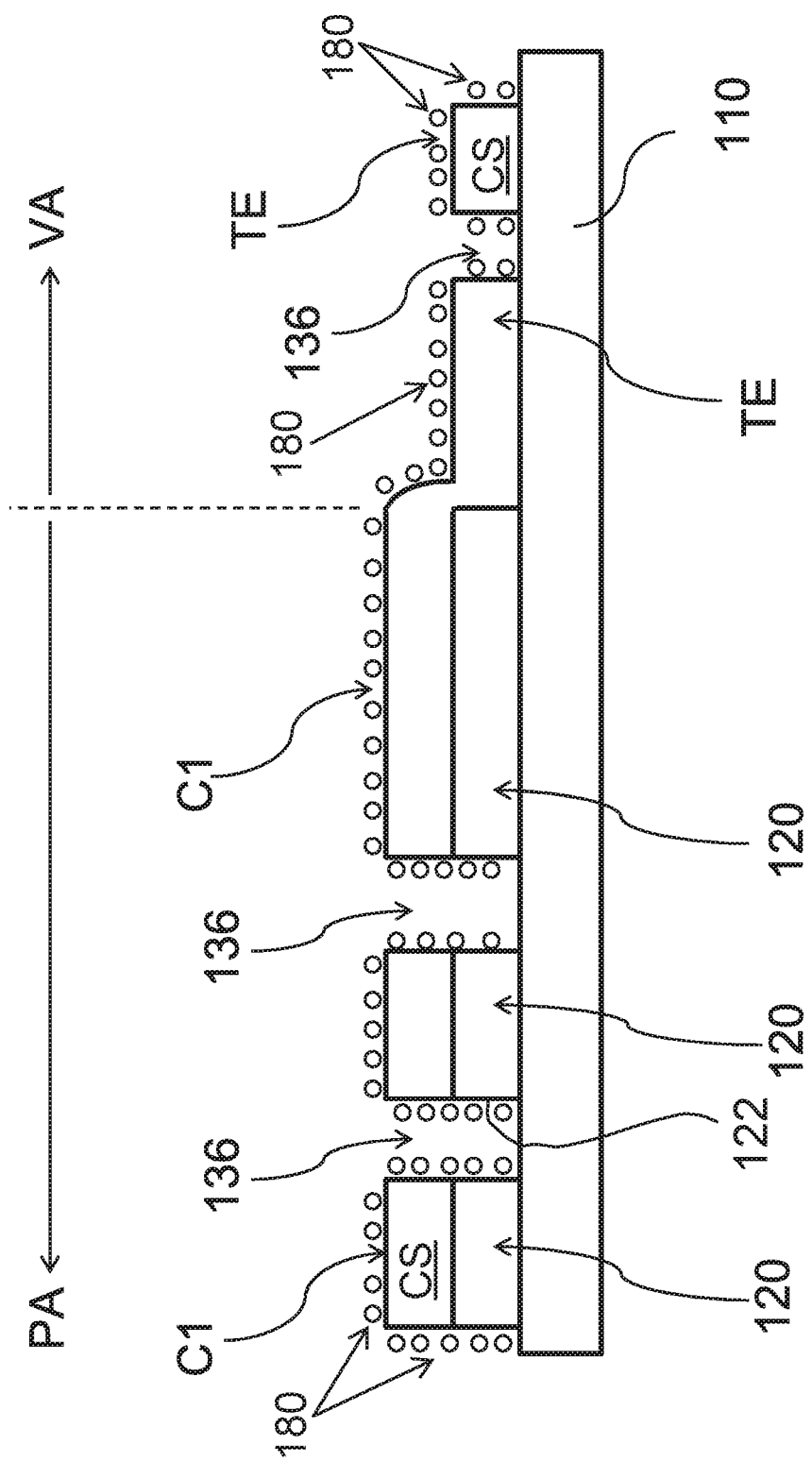
FIG. 6B is a cross-sectional schematic view of another variant example along line B-B of FIG. 1.

The touch panel 100 shown in FIG. 6A to FIG. 6B is the touch panel 100 manufactured by steps of the present example. In the present example, the first covers C1 and the second cover C2 may be a metal nanowire layer NWL including at least the unmodified and modified metal nanowires 190, such as an unmodified and modified silver nanowire layer, an unmodified and modified gold nanowire layer, or an unmodified and modified copper nanowire layer. The touch-sensing electrode TE, the first covers C1, and the second cover C2 may be made of the same layer of the metal nanowire layer NWL. For clarity, in FIG. 6A and FIG. 6B, the covering structure 180 is depicted at the outside of the film layer 130 (or the composite structure CS) to indicate that the metal nanowires 190 exposed or protruding from the film layer 130 have the covering structure 180 due to the modification step. The metal nanowires 190 are omitted in the film layer 130 (or the composite structure CS). In addition, the unmodified metal nanowires 190 embedded in the film layer 130 and the film layer 130 may form the transparent and conductive composite structure CS to represent that the touch-sensing electrode TE includes the modified and unmodified metal nanowires 190. Similarly, the covering structure 180 is depicted at the outside of the first covers C1 and the second cover C2 to represent that the first covers C1 and the second cover C2 include the modified and unmodified metal nanowires 190.

As shown in FIG. 6B, the touch-sensing electrode TE of the present example is mainly disposed on the display region VA. The touch-sensing electrode TE may be electrically connected to the peripheral leads 120. Similar to the previous example, the touch-sensing electrode TE may be the composite structure CS including at least the modified metal nanowires 190. In other words, the composite structure CS on the display region VA is first patterned and then modified to form the touch-sensing electrode TE and therefore is exposed or protruding from the exposed surface of the touch-sensing electrode TE. Accordingly, the covering structure 180 is located on the side or the upper surface of the metal nanowires 190 due to the modification step. Moreover, the unmodified metal nanowires 190 embedded in the film layer 130 and the film layer 130 may form the transparent and conductive composite structure CS.

As shown in FIG. 6A and FIG. 6B, since the modification step is performed after the patterning step, the first covers C1 includes the modified metal nanowires 190 and the transparent and conductive composite structure CS that is formed of the unmodified metal nanowires 190 and the film layer 130. The first covers C1 are also disposed on the upper surfaces 124 of the peripheral leads 120. Similarly, the second cover C2 includes the modified metal nanowires 190 and the transparent and conductive composite structure CS that is formed of the unmodified metal nanowires 190 and the film layer 130. The second cover C2 is also disposed on the upper surface 144 of the mark 140. Moreover, the covering structure 180 is formed on the exposed surface of the peripheral leads 120 by the modification step. For example, the covering structure 180 is formed on the sidewalls 122 of the peripheral leads 120. Similarly, the covering structure 180 is formed on the exposed surface of the mark 140 by the modification step. For example, the covering structure 180 is formed on the sidewall 142 of the mark 140.

In one example, the covering structure 180 may also be formed on side surfaces C1L or upper surfaces of the first covers C1. Alternatively, the covering structure 180 is formed on a side surface C2L or an upper surface of the second cover C2.

In one example, the peripheral region PA may be first covered with a shielding material, such that the covering structure 180 is formed only on the display region VA. In other words, only the touch-sensing electrode TE on the display region VA is subjected to the modification step. Alternatively, a removal step may be performed to remove the covering structure 180 formed on exposed surfaces of the peripheral leads 120, the mark 140, the first covers C1, and the second cover C2.

Figure 7:
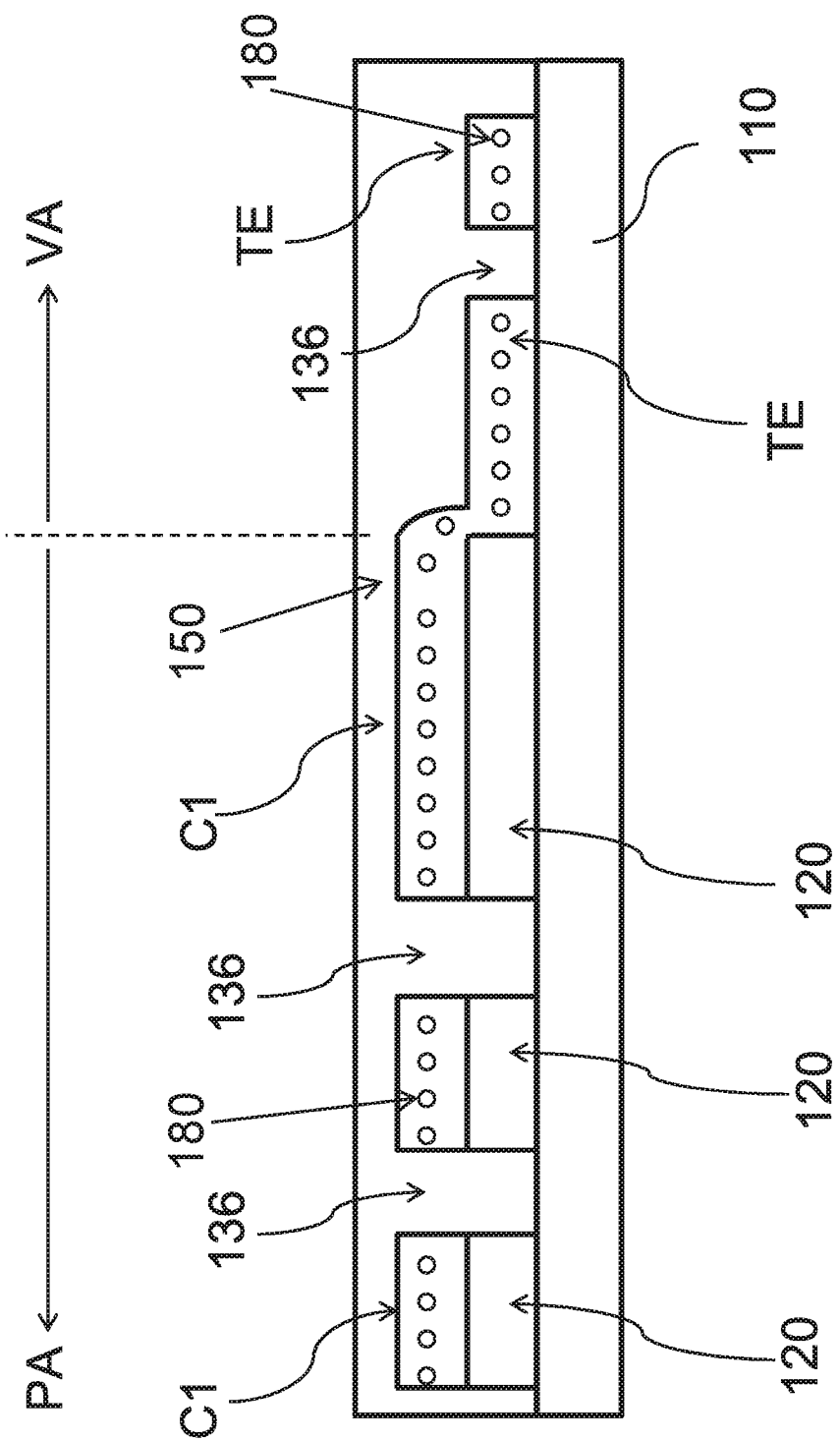
FIG. 7 is a cross-sectional schematic view of a touch panel according to another embodiment of the present disclosure.

In one example, the touch panel 100 may further include a protective layer 150, which may be applied to various examples. Only the example of FIG. 1B is used herein as an example. FIG. 7 shows a cross-sectional schematic view where the protective layer 150 is formed in the example of FIG. 1B. It is noted that the material of the protective layer 150 may be the foregoing exemplary material of the film layer 130. In one example, the touch panel 100 is completely covered by the protective layer 150. In other words, the touch-sensing electrode TE, the peripheral leads 120, the mark 140, the first covers C1, and the second cover C2 are covered by the protective layer 150. The protective layer 150 may fill in the non-conductive region 136 between the adjacent peripheral leads 120 to isolate the adjacent peripheral leads 120. Alternatively, the protective layer 150 may fill in the non-conductive region 136 between the adjacent touch-sensing electrodes TE to isolate the adjacent touch-sensing electrodes TE. Moreover, for a single set of the peripheral leads 120 and the corresponding first covers C1, the protective layer 150 surrounds the single set of the peripheral leads 120 and the corresponding first cover C1. Similarly, for a single set of the mark 140 and the corresponding second cover C2, the protective layer 150 surrounds the single set of the mark 140 and the corresponding second cover C2.

Figure 8:
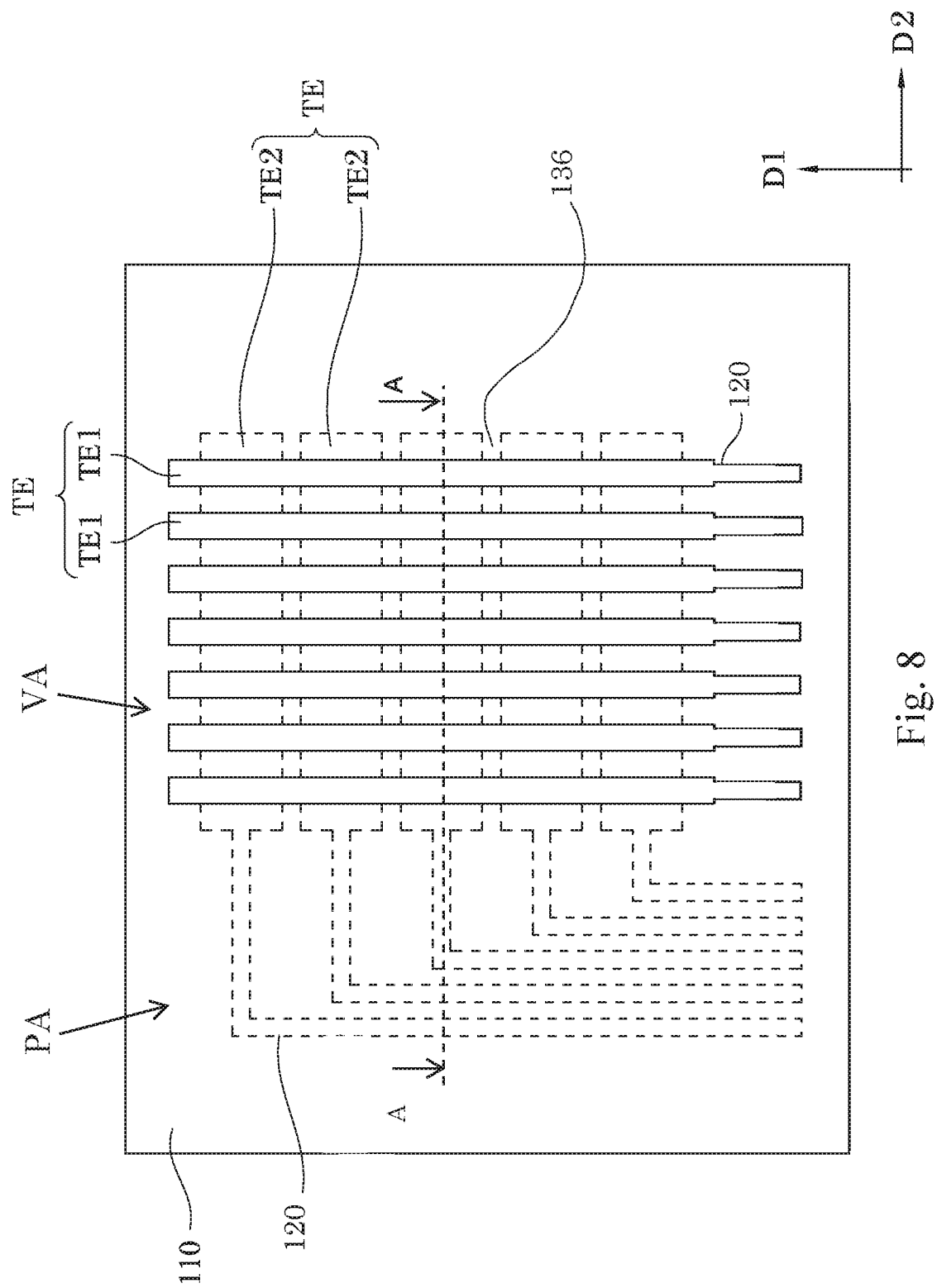
FIG. 8 is a schematic top view of a touch panel according to another embodiment of the present disclosure.
Figure 8A:
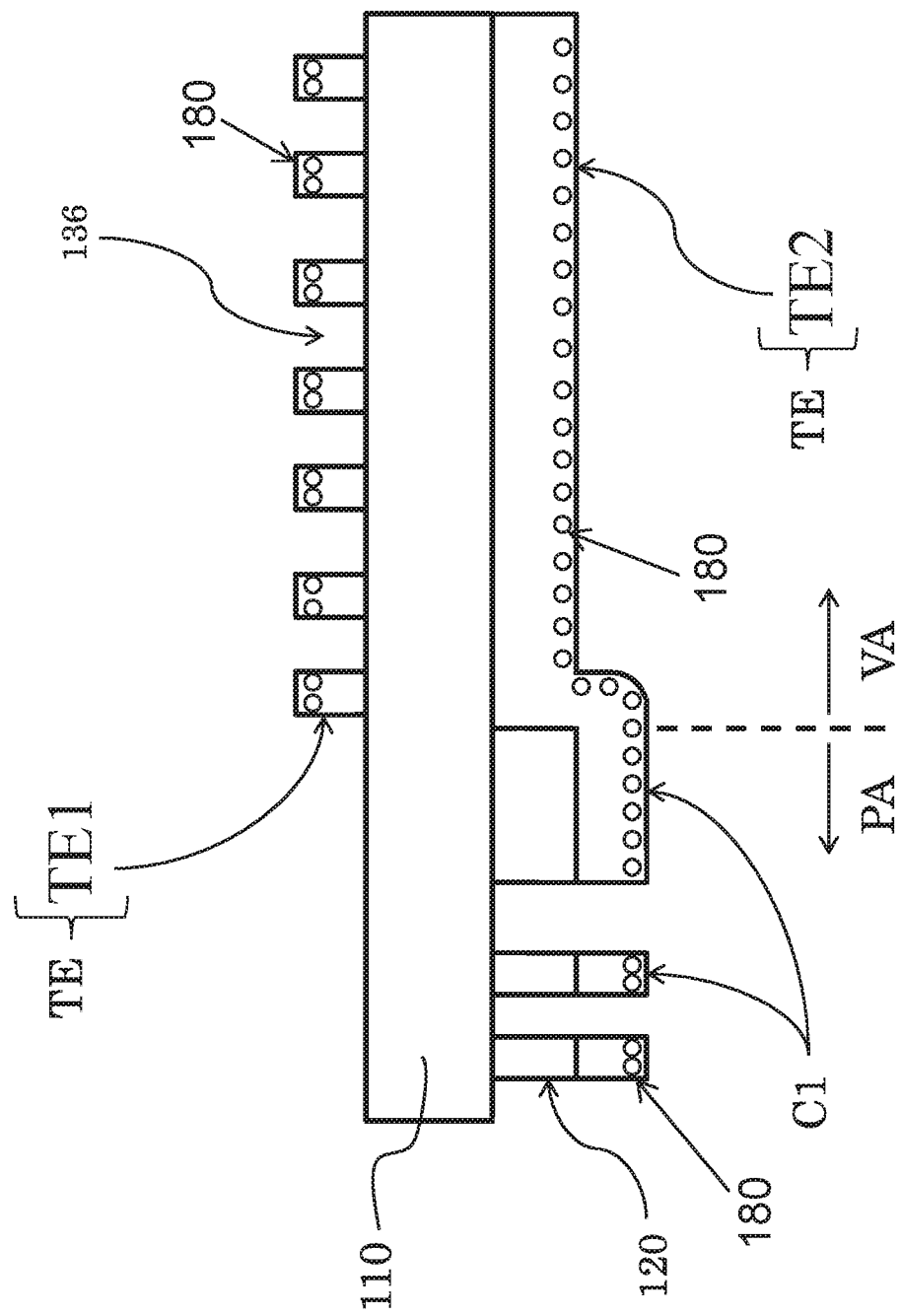
FIG. 8A is a cross-sectional schematic view along line A-A of FIG. 8.

FIG. 8 is a schematic top view of the touch panel 100 according to some embodiments of the present disclosure. The touch-sensing electrode TE of the present embodiment adopts a double-layer configuration. FIG. 8A is a cross-sectional view along line A-A in FIG. 8.

For the convenience of description, a plurality of first touch-sensing electrodes TE1 and a plurality of second touch-sensing electrodes TE2 are used to illustrate the configuration adopted in the present embodiment. The first touch-sensing electrodes TE1 are formed on one surface (such as upper surface) of the substrate 110, while the second touch-sensing electrodes TE2 are formed on another surface (such as lower surface) of the substrate 110, such that the first touch-sensing electrodes TE1 and the second touch-sensing electrodes TE2 are electrically insulated from each other. The peripheral leads 120 electrically connected to the first touch-sensing electrodes TE1 are covered by the corresponding first covers C1. In the same way, the peripheral leads 120 connected to the second touch-sensing electrodes TE2 are covered by the corresponding first covers C1. The first touch-sensing electrodes TE1 are a plurality of bar-shaped electrodes arranged along the first direction D1, and the second touch-sensing electrodes TE2 are a plurality of bar-shaped electrodes arranged along the second direction D2. As shown in drawings, the bar-shaped touch-sensing electrodes TE1 and the bar-shaped touch-sensing electrodes TE2 have different extending directions and interlace with each other. The first touch-sensing electrodes TE1 and the second touch-sensing electrodes TE2 may be used to transmit control signals and receive touch-sensing signals, respectively. Therefore, by means of detecting the change in signal (such as changes in capacitance change) between the first touch-sensing electrodes TE1 and the second touch-sensing electrodes TE2, the touch position can be obtained. With this setting, the user may perform touch-sensing at each point on the substrate 110. As with the previous example, the first touch-sensing electrodes TE1 and/or the second touch-sensing electrodes TE2 may include at least the modified metal nanowires 190 (in order to simplify the drawings, in FIG. 8A, the covering structure 180 represents the modified metal nanowires 190), and the first covers C1 may be made of the modified or unmodified metal nanowires 190. In other examples, the first covers C1 or the second cover C2 may be made of the modified or unmodified metal nanowires 190 by the previous method, and the covering structure 180 may be formed on the outer surface of the peripheral leads 120 or the mark 140 by the previous method.

The double-sided touch panel in the embodiment of the present disclosure may be made in the following manner. First, the substrate 110 having the pre-defined peripheral region PA and display region VA is provided. Next, at the opposite first and second surfaces of the substrate 110 (such as upper surface and lower surface), the metal layer ML is formed on the first and second surfaces of the substrate 110, and the metal layer ML is located on the peripheral region PA. Next, the metal nanowire layer NWL is formed on the first and second surfaces on the peripheral region PA and the display region VA. Then, a modification step is performed, such that the covering structure 180 is formed on the metal nanowires 190 on the lower surface of the substrate 110 (besides the contacting surface at the intersection). Subsequently, the metal nanowire layer NWL and the metal layer ML on the first and second surfaces are patterned respectively to form the first touch-sensing electrodes TE1, the second touch-sensing electrodes TE2, and the peripheral leads 120 on the first and second surfaces, and the peripheral leads 120 are covered by the first covers C1.

As with the previous example, any surface of the substrate 110 (such as upper surface or lower surface) may further include the mark 140 and the second cover C2.

It is noted that all embodiments of this specification may be applied to double-sided touch panels and is not limited to the embodiments exemplified previously.

In the manufacturing method of the double-sided touch panel in the embodiment of the present disclosure, two sets of single-sided touch panels may be stacked in the same direction or in opposite directions. Take the opposite direction stacking as an example, the touch electrodes of the first set of the single-sided touch panel is disposed facing upward (for example, nearest to the user, but is not limited thereto), and the touch electrode of the second set of the single-sided touch panel is disposed facing downward (for example, the farthest away from the user, but is not limited thereto). An optical adhesive or other similar adhesives is used to assemble and fix the substrates of two sets of touch panels, and thereby forming the double-sided touch panel.

Figure 9:
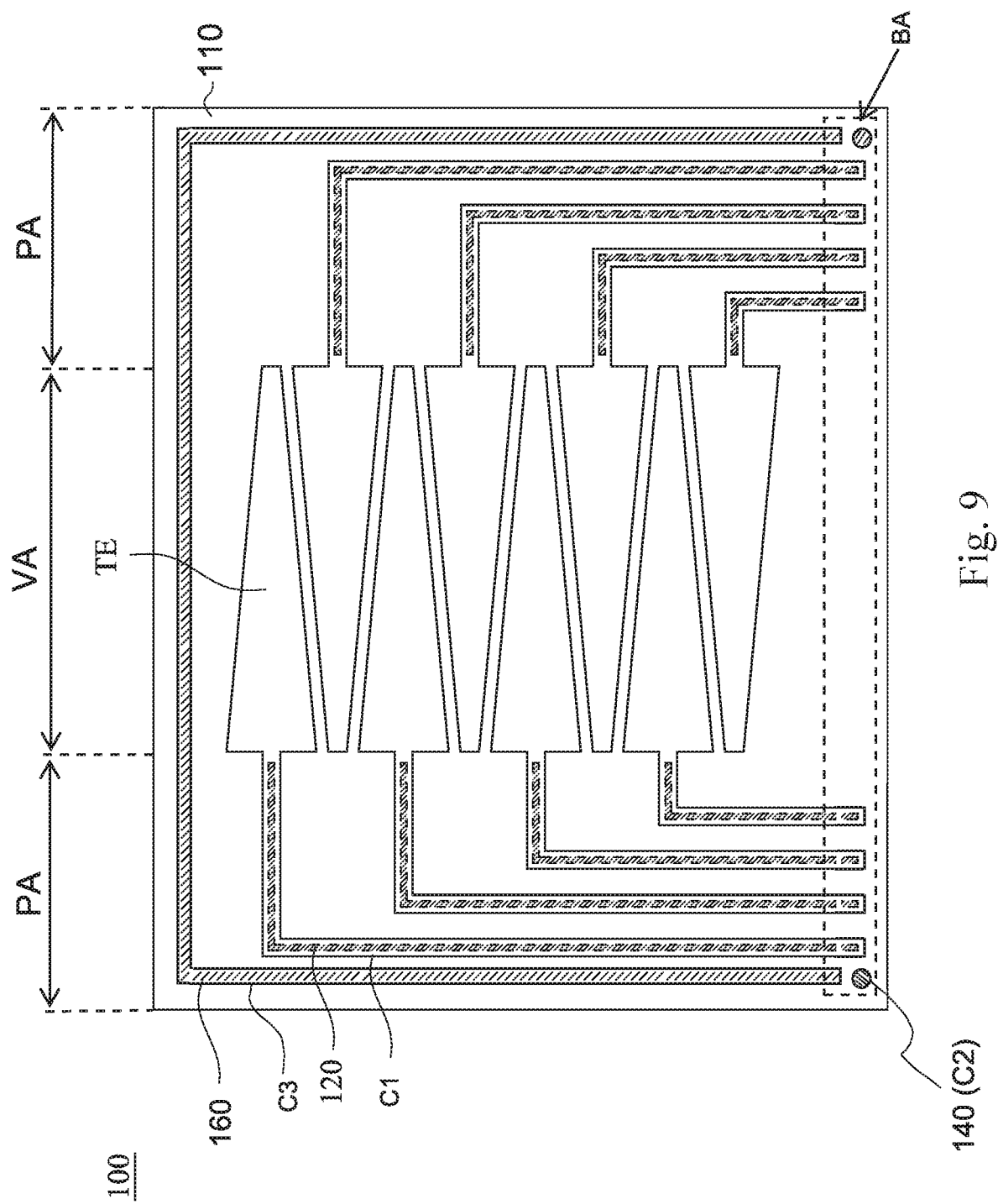
FIG. 9 is a schematic top view of a touch panel according to another embodiment of the present disclosure.

FIG. 9 is a schematic top view of the touch panel 100 according to some embodiments of the present disclosure. The touch panel 100 in the present embodiment further includes a shielding lead 160 disposed on the peripheral region PA. The shielding lead 160 mainly surrounds the touch-sensing electrode TE and the peripheral leads 120. The shielding lead 160 extends to the bonding area BA and is electrically connected to the ground terminal of a flexible circuit board, such that the shielding lead 160 may shield or eliminate signal interference or provide electrostatic discharge (ESD) protection, especially against small current changes caused by human hands touching the connecting leads around the touch device.

The shielding lead 160 may be made of metal material, and preferably, reference can be made to the description of the peripheral leads 120 or the mark 140. A third cover C3 is located on the shielding lead 160 and is made of the modified or unmodified metal nanowires 190. See the description of the first covers C1 or the second cover C2 of the above embodiments. In some examples of the present disclosure, the shielding lead 160, the peripheral leads 120, and the mark 140 may be made of the same layer of the metal layer ML (i.e., they are the same metal material). The touch-sensing electrode TE, the third cover C3, the first covers C1, and the second cover C2 may be made of the same layer of the metal nanowire layer NWL (such as silver nanowire layer), and the metal nanowires 190 may be modified according to the aforementioned process to have the covering structure 180; the specific details are provided the previous description and therefore are not repeated herein.

Figure 10:
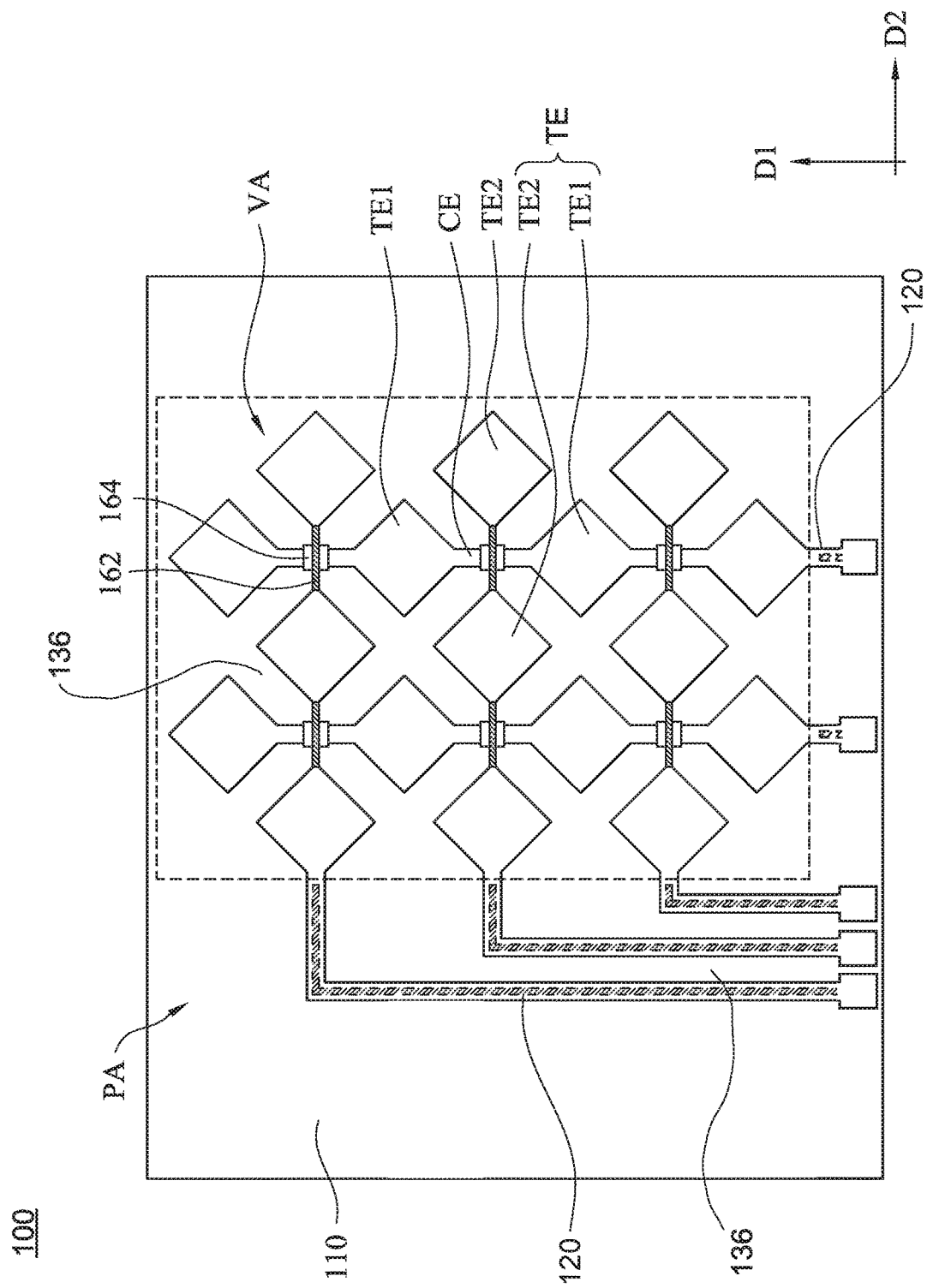
FIG. 10 is a schematic view of a touch panel according to another embodiment of the present disclosure.

FIG. 10 shows another example of the single-sided touch panel 100 in the present disclosure, which is a single-sided bridge touch panel. The difference between the present example and the previous example is at least that, the touch-sensing electrode TE formed of the transparent conductive layer (i.e., metal nanowire layer 140A) on the substrate 110 after the patterning step may include the first touch-sensing electrodes TE1 arranged along the first direction D1, the second touch-sensing electrodes TE2 arranged along the second direction D2, and a connecting electrode CE electrically connecting the adjacent first touch-sensing electrodes TE1. In other words, the first touch-sensing electrodes TE1, the second touch-sensing electrodes TE2, and the connecting electrodes CE are made of the modified or unmodified metal nanowires 190. Furthermore, an insulating block 164 may be disposed on the connecting electrode CE. For example, the insulating block 164 is formed of silicon dioxide. A bridging lead 162 is then disposed on the insulating block 164. For example, the bridging lead 162 is formed of copper, ITO, metal nanowires, etc. The bridging lead 162 is connected to the adjacent second touch-sensing electrodes TE2 in the second direction D2. The insulating block 164 is located between the connecting electrode CE and the bridging lead 162 to electrically isolate the connecting electrode CE and the bridging lead 162, such that the first touch-sensing electrodes TE1 arranged along the first direction D1 and the second touch-sensing electrode TE2 arranged along the second direction D2 are electrically isolated from each other. The specific details are provided in the previous description and therefore are not repeated herein.

In some embodiments, the touch panel 100 described herein may be manufactured by a roll-to-roll process. The roll-to-roll process adopts conventional equipment and may be fully automated, significantly reducing the cost of manufacturing touch panels. The specific method of a roll-to-roll process is as follows. First, a flexible substrate 110 is selected. The substrate 110 is installed in a roll-shape between two rollers and a motor is used to drive the rollers, such that the substrate 110 may be processed continuously along the moving path between the two rollers. For example, a slurry including the metal nanowires 190 may be deposited on the surface of the substrate 110 by using a storage tank, a spray device, a brushing device, or the like to form the metal nanowires 190. A polymer is deposited on the surface of the substrate 110 by a spraying head, and the polymer is cured to form the film layer 130, followed by patterning and modification steps. Subsequently, the touch panel 100 is rolled out by the roller at the end of the production line to form a touch-sensing tape-on-reel.

The touch-sensing tape-on-reel in the present example may further include a protective layer 150 completely covering the touch panel 100 that is not diced on the touch-sensing tape-on-reel. In other words, the protective layer 150 may cover multiple touch panels 100 that are not diced on the touch-sensing tape-on-reel, which are then diced and separated into individual touch panels 100.

In some embodiments of the present disclosure, the substrate 110 is preferably to be a transparent substrate, and specifically may be a rigid transparent substrate or a flexible transparent substrate, where the material can be selected from glass, acrylic polymethylmethacrylate (PMMA), polyvinyl chloride (PVC), polypropylene (PP), polyethylene terephthalate (PET), polyethylene naphthalate (PEN), polycarbonate (PC), polystyrene (PS), cyclo olefin polymer (COP), colorless polyimide (CPI), cycloolefin copolymer (COC), and other transparent materials. In order to increase the adhesion between the substrate 110 and the metal nanowires 190, a pre-processing step may be preferably performed to the substrate 110. For example, a surface modification process may be performed, or additionally an adhesive layer or a resin layer may be coated on the surface of the substrate 110.

In some embodiments of the present disclosure, the metal nanowires 190 may be silver nanowires or silver nanofibers, which may have an average diameter of about 20 to 100 nanometers and an average length of 20 to 100 micrometers. Preferably, the average diameter is about 20 to 70 nanometers and the average length is about 20 to 70 micrometers. Namely, the aspect ratio is 1000. In some embodiments, the diameter of the metal nanowires 190 may be between 70 nanometers to 80 nanometers, and the length may be about 8 micrometers.

The sequence of multiple coating steps in the roll-to-roll production line may be adjusted along the movement path of the substrate according to requirements or may incorporate any number of additional platforms as required. For example, in order to obtain a suitable post-processing process, pressure rollers or plasma equipment may be installed in the production line.

The touch panel of the example in the present disclosure may be assembled with other electronic devices, such as a display device with a touch-control function. For example, the substrate 110 may be attached to a display component, such as a liquid crystal display component or an organic light-emitting diode (OLED) display component, and the display component can be laminated with an optical adhesive or other similar adhesives. The touch-sensing electrode TE can also be laminated by using an optical adhesive and an outer cover layer (such as protective glass). The touch panel of the present disclosure example can be applied on electronic devices such as portable phones, tablet computers, laptop computers, etc.

The structures of different examples of the present disclosure may be mutually cited, and are not limited to the foregoing specific embodiments.

In some embodiments of the present disclosure, by modifying the metal nanowires 190 without affecting the direct contact between the metal nanowires 190, the conductive characteristics of the electrode formed of the metal nanowires 190 may be maintained, and the modified metal nanowires 190 may have improved optical properties relative to before modification.

In some embodiments of the present disclosure, compared with before modification, the haze of the modified metal nanowires 190 may be reduced by more than 10%. Compared with before modification, the electrical conductivity of the modified metal nanowires 190 is not affected. For example but not limitation, the change in resistance (equivalent to electrical conductivity) is below 5%. Compared with before modification, the change in transmission of the modified metal nanowires 190 is below 5%, below 1%, below 0.5%, or the transmission remains the same before and after treatment.

In some embodiments of the present disclosure, coating the metal nanowires 190 (such as silver nanowires) with a palladium material to achieve a blackening effect may effectively reduce the reflectance of the silver nanowire, thereby reducing the haze thereof. The following table provides data in a specific example.

| | Before Treatment | | | After Treatment | | | Difference between before and after treatment | | |
|---|---|---|---|---|---|---|---|---|---|
| Treatment time | T | H | R | T | H | R | ΔT | ΔH | ΔR |
| 30 seconds | 90.6 | 3.09 | 15.78 | 90.8 | 3.08 | 16.11 | 0.2 | −0.5% | 2.11% |
| 1 minute | 90.1 | 3.46 | 12.80 | 90.3 | 3.42 | 13.01 | 0.2 | −1.6% | 1.62% |
| 2 minutes | 89.4 | 3.93 | 13.65 | 89.6 | 3.84 | 14.27 | 0.2 | −4.7% | 4.54% |
| 5 minutes | 91 | 3.03 | 16.05 | 91 | 2.82 | 18.90 | 0 | −10.3% | 4.86% |

Note:
T represents transmission (%), H represents haze, R represents sheet resistance (ohm/square), and Δ represents the difference between before and after treatment.

In some embodiments of the present disclosure, by designing a covering layer that is formed of the metal nanowires 190 to cover the peripheral leads 120 and/or the upper surface of the mark 140, the requirement of providing an alignment error region in the alignment process is reduced or avoided, thereby effectively reducing the width of the peripheral region.

Although the present disclosure has been disclosed in various embodiments as above, it is not intended to limit the present disclosure. It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel, comprising:
    a substrate having a display region and a peripheral region;
    a plurality of peripheral leads disposed on the peripheral region of the substrate;
    a plurality of first covers covering upper surfaces of the peripheral leads; and
    a touch-sensing electrode disposed on the display region of the substrate, the touch-sensing electrode electrically connecting to the peripheral leads, wherein:
        the touch-sensing electrode comprises a plurality of modified metal nanowires,
        the modified metal nanowires have first surfaces in direct contact with each other at an intersection,
        the modified metal nanowires have second surfaces with a covering structure,
        the second surfaces are at non-intersections, and
        a first modified metal nanowire of the modified metal nanowires comprises a first covering structure contacting a first portion of the second surface of the first modified metal nanowire between a second portion of the second surface of the first modified metal nanowire and a third portion of the second surface of the first modified metal nanowire that do not contact the first covering structure.

2. The touch panel of claim 1, wherein the first covers comprise the modified metal nanowires.

3. The touch panel of claim 1, wherein the first covers comprise a plurality of unmodified metal nanowires.

4. The touch panel of claim 1, further comprising a film layer, wherein the modified metal nanowires are exposed from the film layer.

5. The touch panel of claim 4, wherein the touch-sensing electrode further comprises a plurality of unmodified metal nanowires disposed in the film layer.

6. The touch panel of claim 1, wherein the covering structure is a layered structure, an island-shaped protrusion structure, or a point-shaped protrusion structure which are made of a conductive material, or a combination thereof.

7. The touch panel of claim 6, wherein the conductive material is silver, gold, copper, platinum, iridium, rhodium, palladium, or osmium.

8. The touch panel of claim 6, wherein the conductive material is graphene, carbon nanotubes, conductive polymers, or conductive oxides.

9. The touch panel of claim 1, wherein 0.1-10% of a total surface area of the modified metal nanowires is covered with the covering structure.

10. The touch panel of claim 1, wherein the covering structure is made of a conductive material.

11. A method of manufacturing a touch panel, comprising:
    providing a substrate having a display region and a peripheral region;
    disposing a metal layer on the peripheral region;
    disposing a plurality of unmodified metal nanowires on the display region and the peripheral region, wherein the unmodified metal nanowires have first surfaces in direct contact with each other at an intersection, and the unmodified metal nanowires each have a second surface at a non-intersection;
    performing a modification step to form a metal nanowire layer comprising a plurality of modified metal nanowires, wherein the second surface of each of the modified metal nanowires has a covering structure and the first surface of each of the modified metal nanowires does not have the covering structure; and
    performing a patterning step, comprising: patterning the metal nanowire layer on the display region to form a touch-sensing electrode comprising the modified metal nanowires.

12. The method of claim 11 for manufacturing the touch panel, wherein performing the patterning step further comprises patterning the metal layer and the metal nanowire layer on the peripheral region at one time, wherein the patterned metal layer forms a plurality of peripheral leads, the patterned metal nanowire layer forms a plurality of first covers, and the first covers are disposed on the peripheral leads.

13. The method of claim 12 for manufacturing touch panel, wherein the first covers comprise the modified metal nanowires.

14. The method of claim 11 for manufacturing the touch panel, wherein disposing the unmodified metal nanowires on the display region and the peripheral region comprises disposing a film layer on the unmodified metal nanowires, wherein an exposed portion of the unmodified metal nanowires is exposed from the film layer, the exposed portion forms the modified metal nanowires by the modification step, and a non-exposed portion of the unmodified metal nanowires is embedded in the film layer and is not affected by the modification step.

15. The method of claim 11 for manufacturing the touch panel, wherein the modification step comprises coating, chemical plating, electroplating, or sputtering to form the covering structure, and the covering structure is a layered structure, an island-shaped protrusion structure, or a point-shaped protrusion structure which are made of a conductive material, or a combination thereof.

16. The method of claim 15 for manufacturing the touch panel, wherein the conductive material is silver, gold, copper, platinum, iridium, rhodium, palladium, or osmium.

17. The method of claim 15 for manufacturing the touch panel, wherein the conductive material is graphene, carbon nanotubes, conductive polymers, or conductive oxides.

18. The method of claim 15, wherein the modification step comprises covering 0.1-10% of a total surface area of the modified metal nanowires with the covering structure.

19. A touch panel, comprising:
    a substrate having a display region and a peripheral region;
    a plurality of peripheral leads disposed on the peripheral region of the substrate;
    a plurality of first covers covering upper surfaces of the peripheral leads;
    a touch-sensing electrode disposed on the display region of the substrate, the touch-sensing electrode electrically connecting to the peripheral leads; and a film layer, wherein:
  the touch-sensing electrode comprises a plurality of modified metal nanowires,
  the modified metal nanowires have first surfaces in direct contact with each other at an intersection,
  the modified metal nanowires have second surfaces with a covering structure,
  the second surfaces are at non-intersections,
  the modified metal nanowires are exposed from the film layer, and
  the touch-sensing electrode further comprises a plurality of unmodified metal nanowires disposed in the film layer.

20. The touch panel of claim 19, wherein 0.1-10% of a total surface area of the modified metal nanowires is covered with the covering structure.

* * * * *